US 11,841,752 B2

(12) United States Patent
Thomas et al.

(10) Patent No.: US 11,841,752 B2
(45) Date of Patent: Dec. 12, 2023

(54) CONTROLLING AVERAGE POWER LIMITS OF A PROCESSOR

(71) Applicant: Intel Corporation, Santa Clara, CA (US)

(72) Inventors: Tessil Thomas, Cambridge (GB); Lokesh Sharma, Bangalore (IN); Buck Gremel, Olympia, WA (US); Ian Steiner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 17/338,547

(22) Filed: Jun. 3, 2021

(65) Prior Publication Data

US 2021/0294400 A1     Sep. 23, 2021

Related U.S. Application Data

(63) Continuation of application No. 16/215,978, filed on Dec. 11, 2018, now Pat. No. 11,079,819, which is a continuation of application No. 14/554,585, filed on Nov. 26, 2014, now abandoned.

(51) Int. Cl.
*G06F 1/20* (2006.01)
*G06F 1/3234* (2019.01)

(52) U.S. Cl.
CPC ............ *G06F 1/206* (2013.01); *G06F 1/3243* (2013.01); *Y02D 10/00* (2018.01)

(58) Field of Classification Search
None
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,297,685 | B1 * | 10/2001 | Ewen ............... H03K 19/00376 327/513 |

(Continued)

FOREIGN PATENT DOCUMENTS

EP     1282030     5/2003

OTHER PUBLICATIONS

Advisory Action dated May 10, 2017 for U.S. Appl. No. 14/554,585.

(Continued)

*Primary Examiner* — Paul Yen
(74) *Attorney, Agent, or Firm* — Schwabe, Williamson & Wyatt, P.C.

(57) ABSTRACT

In one embodiment, a processor includes at least one core to execute instructions, one or more thermal sensors associated with the at least one core, and a power controller coupled to the at least one core. The power controller has a control logic to receive temperature information regarding the processor and dynamically determine a maximum allowable average power limit based at least in part on the temperature information. The control logic may further maintain a static maximum base operating frequency of the processor regardless of a value of the temperature information. Other embodiments are described and claimed.

21 Claims, 19 Drawing Sheets

(56) References Cited

U.S. PATENT DOCUMENTS

| | | |
|---|---|---|
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis et al. |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,710,043 B2 | 7/2017 | Weissman et al. |
| 2001/0044909 A1 | 11/2001 | Oh et al. |
| 2002/0101218 A1 | 8/2002 | Koenck et al. |
| 2002/0194509 A1 | 12/2002 | Plante et al. |
| 2003/0061383 A1 | 3/2003 | Zilka |
| 2004/0003299 A1 | 1/2004 | Malueg et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard |
| 2006/0053326 A1 | 3/2006 | Naveh et al. |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0167657 A1 | 7/2006 | Naffziger et al. |
| 2006/0184287 A1 | 8/2006 | Belady et al. |
| 2006/0294400 A1* | 12/2006 | Diefenbaugh ........ G06F 1/3203 713/300 |
| 2007/0005995 A1 | 1/2007 | Kardach et al. |
| 2007/0016817 A1 | 1/2007 | Albonesi et al. |
| 2007/0049133 A1 | 3/2007 | Conroy et al. |
| 2007/0079294 A1 | 4/2007 | Knight |
| 2007/0106827 A1 | 5/2007 | Boatright et al. |
| 2007/0113109 A1 | 5/2007 | Kim |
| 2007/0156992 A1 | 7/2007 | Jahagirdar |
| 2007/0214342 A1 | 9/2007 | Newbum |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2008/0278905 A1* | 11/2008 | Artman ............. H05K 7/20836 361/679.48 |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0296342 A1* | 12/2009 | Matteson ................ G06F 1/206 361/679.46 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0213919 A1 | 8/2010 | Takayanagi et al. |
| 2011/0154090 A1 | 6/2011 | Dixon et al. |
| 2011/0161685 A1 | 6/2011 | Lin et al. |
| 2012/0054521 A1 | 3/2012 | Naffziger |
| 2012/0079290 A1 | 3/2012 | Kumar et al. |
| 2012/0159201 A1 | 6/2012 | Distefano et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0147490 A1* | 6/2013 | Lindegger ........ A61M 5/14244 324/435 |
| 2013/0159755 A1 | 6/2013 | Presant et al. |
| 2014/0068290 A1 | 3/2014 | Bhandaru et al. |
| 2014/0181539 A1 | 6/2014 | Lin |
| 2015/0143142 A1 | 5/2015 | Park et al. |
| 2016/0034009 A1 | 2/2016 | Wang et al. |

OTHER PUBLICATIONS

Final Office Action dated Feb. 6, 2017 for U.S. Appl. No. 14/554,585.
Final Office Action dated Jul. 12, 2018 for U.S. Appl. No. 14/554,585.
Intel Corporation, "Intel 64 and IA-32 Architectures Software Developer's Manual," vol. 3 (3A, 38 & 3C): System Programming Guide, Feb. 2014, Chapter 14 Power and Thermal Management (14.1-14.9.5), 44 pages.
Intel Technology Journal, "Power and Thermal Management in the Intel Core Duo Processor," May 15, 2006, pp. 109-122.
Intel White Paper Measuring Processor Power p. 2-3, https://www.intel.com/content/dam/doc/white-paper/resources-xeon-measuring-processor-power-paper.pdf, published Apr. 2011.
International Application No. PCT/US2012/028865, filed Mar. 13, 2012, by Intel Corporation.
International Application No. PCT/US2012/028876, filed Mar. 13, 2012, by Intel Corporation.
International Application No. PCT/US2012/028902, filed Mar. 13, 2012 by Intel Corporation.
Non-Final Office Action dated May 29, 2020 for U.S. Appl. No. 16/215,978.
Non-Office Action dated Aug. 25, 2016 for U.S. Appl. No. 14/554,585.
Notice of Allowance dated Mar. 8, 2021 for U.S. Appl. No. 16/215,978.
Office Action dated Dec. 14, 2017 for U.S. Appl. No. 14/554,585.
SPEC—Power and Performance, Design Overview V1 .10, Standard Performance Information Corp., Oct. 21, 2008, 6 pages.
Benini, L. et al., "System-Level Dynamic Power Management", Proceedings of the IEEE Alessandro Volta Memorial Workshop on Low- Power Design, Mar. 4-5, 1999. Como, Italy. 9 pages.
Iyer, A. et al., "Power and Performance Evaluation of Globally Asynchronous Locally Synchronous Processors", Proceedings ISCA May '02, pp. 1-11.
Jejurikar, R., "Dynamic Slack Reclamation With Procrastination Scheduling In Real-Time Embedded Systems", Proceedings of the 42nd Design Automation Conference. Jun. 13-17, 2005. Anaheim, CA, USA. 5 pages.
Jejurikar, R., "Leakage Aware Dynamic Voltage Scaling For Real-Time Embedded Systems", Proceedings of the 41th Design Automation Conference, DAC 2004, San Diego, CA, USA, Jun. 7-11, 2004. 6 pages.
Kahn, O. et al., "Intel Next Generation Microarchitecture Codename Sandy Bridge: New Processor Innovations", Intel Developer Forum, IDF2010. Sep. 13, 2010, 58 pages.
Kalman, R., "A New Approach To Linear Filtering and Prediction Problems", Journal of Fluids Engineering, vol. 82, Issue 1, Mar. 1960. 11 pages.
Magklis, G. et al., "Profile-Based Dynamic Voltage and Frequency Scaling for a Multiple Clock Domain Microprocessor", Proceedings of the 30th Annual International Symposium on Computer Architecture. Jun. 9-11, 2003. San Diego, CA, USA. pp. 1-12.
Marculescu, D., "Application Adaptive Energy Efficient Clustered Architectures", ISLPED '04: Proceedings of the 2004 international symposium on Low power electronics and design. Aug. 2004 pp. 344-349. https://doi.org/10.1145/1013235.1013318.
Parcerisa, J-M et al., "Efficient Interconnects for Clustered Microarchitectures", Proceedings of the International Conference on Parallel Architectures and Compilation Techniques. Jan. 6, 2003. Charlottesville, VA, USA. pp. 1-10.

(56) References Cited

OTHER PUBLICATIONS

Semeraro, G. et al., "Dynamic Frequency and Voltage Control for a Multiple Clock Domain Architecture", MICRO 35: Proceedings of the 35th annual ACM/IEEE international symposium on Microarchitecture Nov. 2002 pp. 356-367 pp. 1-12.

Semeraro, G. et al., "Energy-Efficient Processor Design Using Multiple Clock Domains with Dynamic Voltage and Frequency Scaling", Proceedings of the Eighth International Symposium on High Performance Computer Architecture. Aug. 7, 2002. 11 pages.

Semeraro, G. et al., "Hiding Synchronization Delays In A GALS Processor Microarchitecture", Proceedings of 10th International Symposium on Asynchronous Circuits and Systems, 2004. IEEE. Crete, Greece. pp. 1-13.

Todling, R. et al., "Some Strategies For Kalman Filtering and Smoothing", Seminar on Data Assimilation, Sep. 2-6, 1996. Shinfield Park, Reading. https://www.ecmwf.int/node/12755. 21 pages.

\* cited by examiner

1100

CONTROLLING AVERAGE POWER LIMITS OF A PROCESSOR

CLAIM FOR PRIORITY

This application is a continuation of, and claims the benefit of priority to U.S. Patent application Ser. No. 16/215,978, filed on Dec. 11, 2018, issued as U.S. Pat. No. 11,079,819 on Aug. 3, 2021, and titled "Controlling Average Power Limits of a Processor", which in turn is a Continuation of, and claims the benefit of priority to U.S. patent application Ser. No. 14/554,585, filed on Nov. 26, 2014, published as US2016/0147280 on May 26, 2016, now abandoned, titled "Controlling Average Power Limits of a Processor", both of which are incorporated herein by reference in their entirety.

TECHNICAL FIELD

Embodiments relate to power management of a processor.

BACKGROUND

Advances in semiconductor processing and logic design have permitted an increase in the amount of logic that may be present on integrated circuit devices. As a result, computer system configurations have evolved from single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chips (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
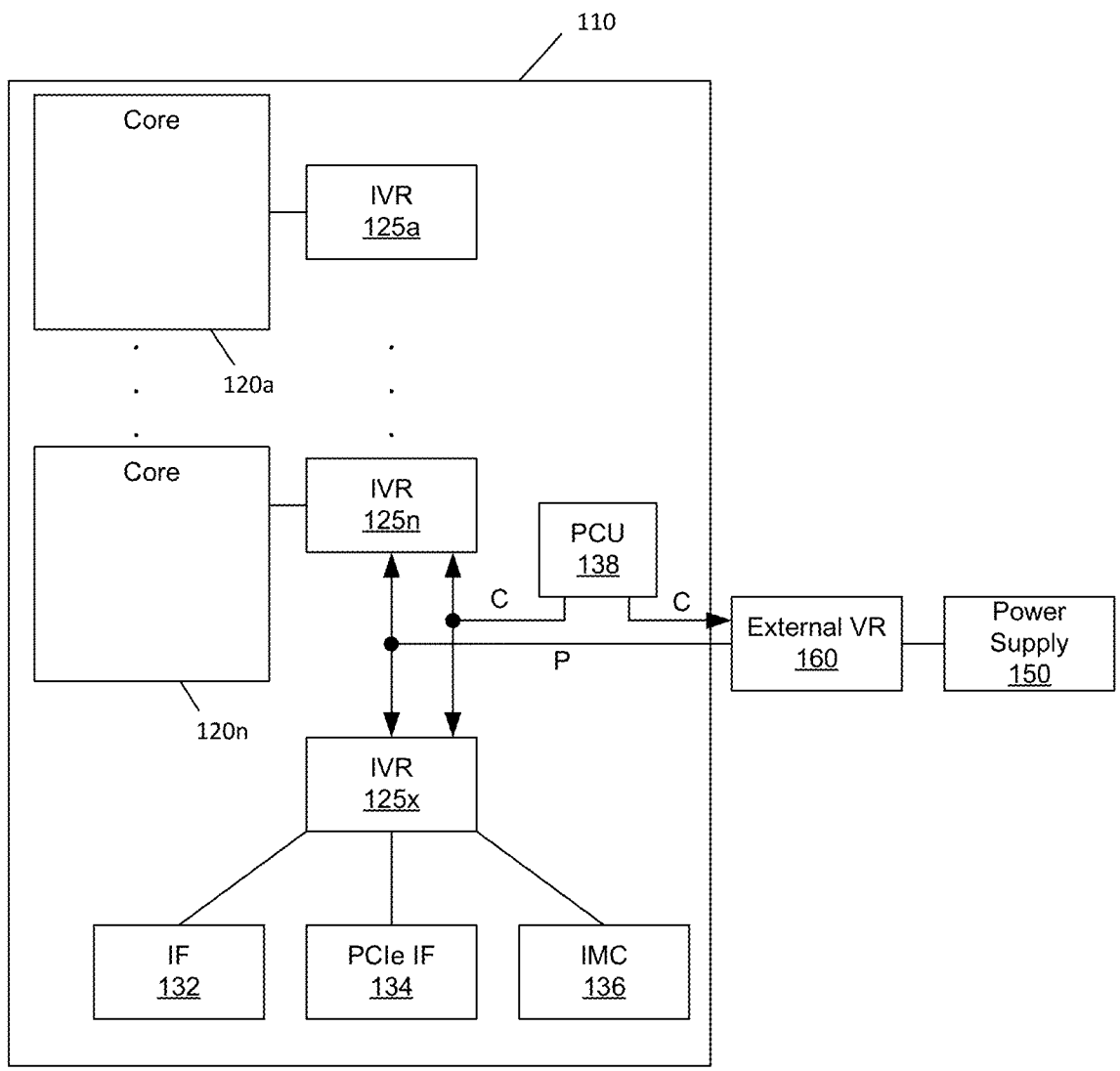
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to power supply 150 via external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including input/output interface 132, another interface 134, and integrated memory controller 136. As seen, each of these components may be powered by another integrated voltage regulator $125_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or power management may be performed responsive to external sources (such as a platform or management power management source or system software). In an embodiment, PCU 138 includes control logic to enable a maximum allowed average power limit of the processor to be dynamically maximized across an entire thermal spectrum at which the processor may operate, while complying with processor constraints. Thus, rather than a fixed maximum allowable average power limit, embodiments enable a processor to operate using a higher (and dynamic) energy budget, e.g., based on a lower temperature of operation.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest base performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than base frequency. In many implementations a processor can include multiple so-called bin frequencies above the P1 base maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle, it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, CA, to provide optimal performance at a lowest power consumption level. In another example, DVFS may be performed using Intel TurboBoost™ technology to enable one or more cores or other compute engines to operate at a higher than base operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
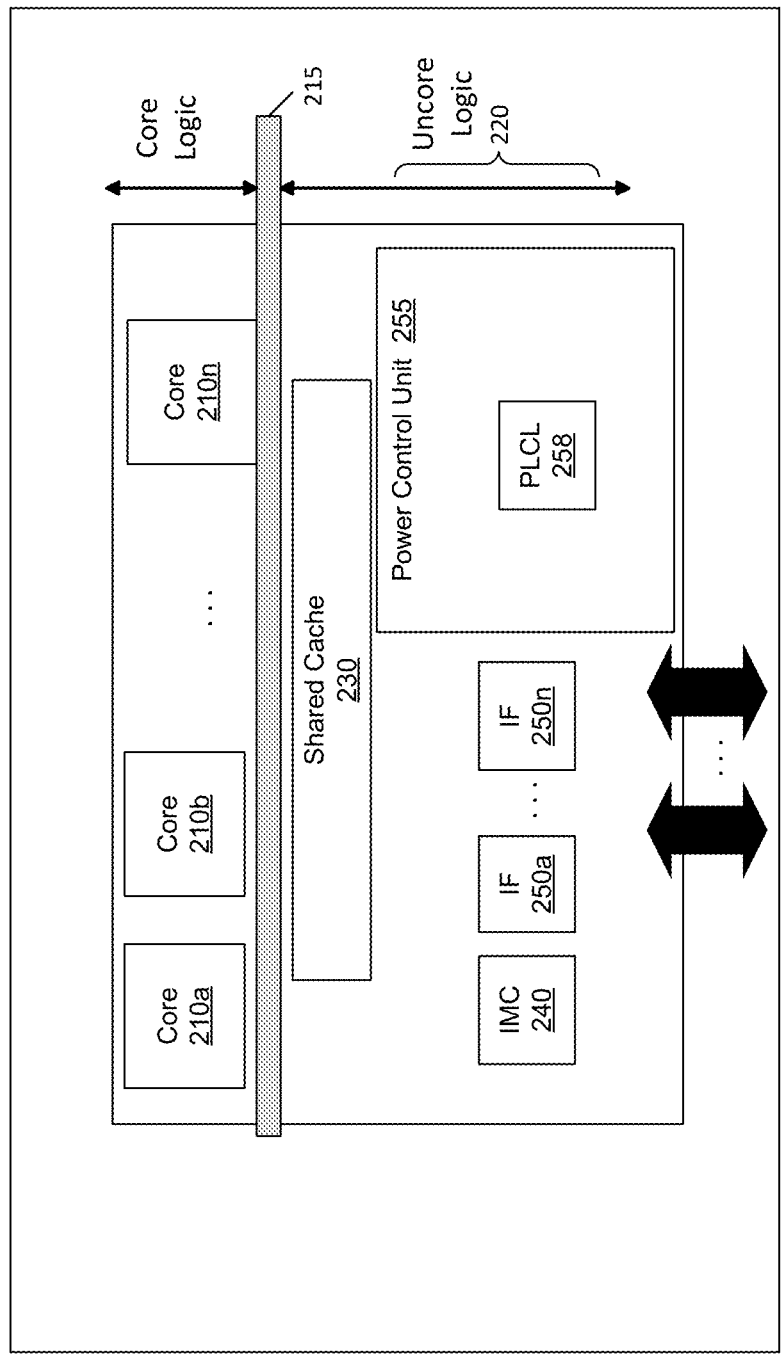
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via interconnect 215 to a system agent or uncore 220 that includes various components. As seen, uncore 220 may include shared cache 230 which may be a last level cache. In addition, uncore 220 may include an integrated memory controller 240 to communicate with a system memory (not shown in FIG. 2), e.g., via a memory bus. Uncore 220 also includes various interfaces 250 and power control unit 255, which may include power limit control logic 258 to dynamically update a power limit for the processor based at least in part on one or more operating parameters (e.g., temperature), as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
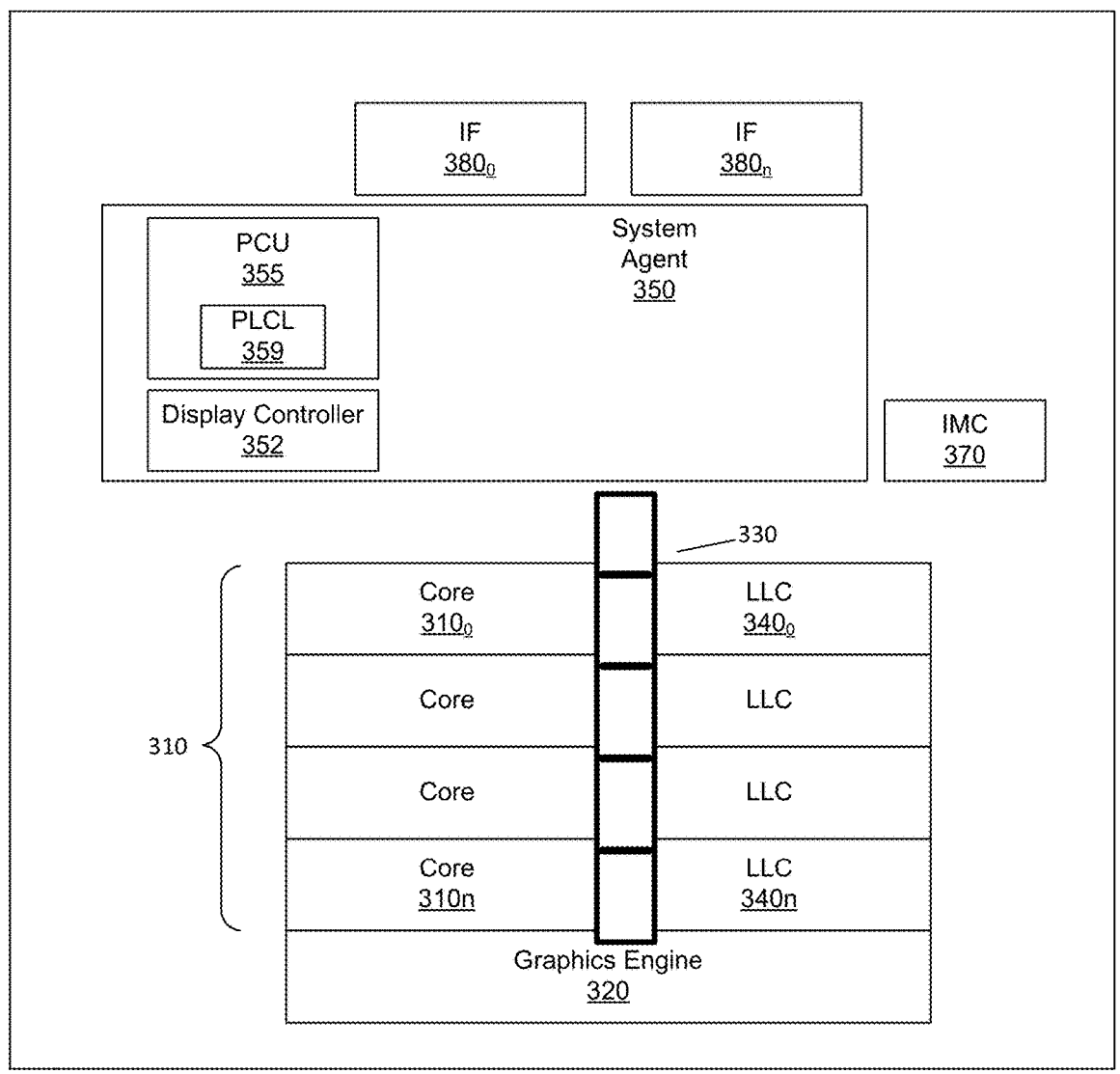
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, core domain 310 can include a plurality of cores $310_0$-$310_n$, graphics domain 320 can include one or more graphics engines, and system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand that the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, ring interconnect 330 thus couples the cores together, and provides interconnection between cores, graphics domain 320 and system agent circuitry 350. In one embodiment, interconnect 330 can be part of the core domain. However, in other embodiments the ring interconnect can be of its own domain.

As further seen, system agent domain 350 may include display controller 352 which may provide control of, and an interface to an associated display. As further seen, system agent domain 350 may include a power control unit 355 which can include a power limit control logic 359 to perform the power management techniques described herein, including dynamic updates to a TDP or other power limit based at least in part on a temperature of the processor, to enable a maximized base operating frequency across a thermal profile of the processor.

As further seen in FIG. 3, processor 300 can further include integrated memory controller (IMC) 370 that can provide for an interface to a system memory, such as a dynamic random-access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
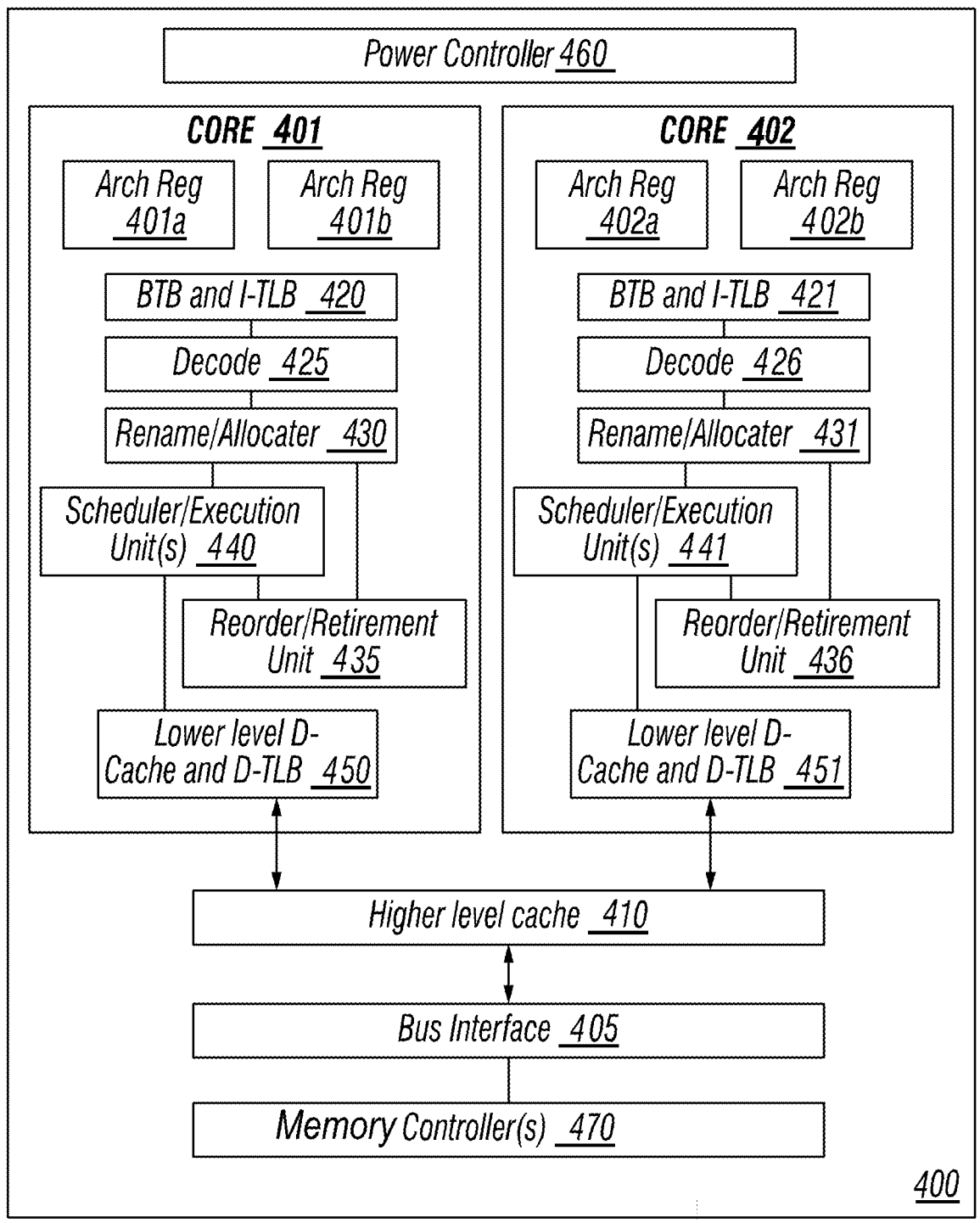
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores-cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general-purpose internal registers, page-table base register(s), low-level data-cache and data-TLB 450, execution unit(s) 440, and portions of out-of-order unit 435 are potentially fully shared. As illustrated, architecture state registers 402a are replicated in architecture state registers 402b, so individual architecture states/contexts are capable of being stored for logical processor 402a and logical processor 402b. In core 402, other smaller resources, such as instruction pointers and renaming logic in allocator and renamer block 431 may also be replicated for threads 402a and 402b. Some resources, such as re-order buffers in reorder/retirement unit 436, ILTB 421, load/store buffers, and queues may be shared through partitioning. Other resources, such as general-purpose internal registers, page-table base register(s), low-level data-cache and data-TLB 451, execution unit(s) 441, and portions of out-of-order unit 436 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating-point instruction is scheduled on a port of an execution unit that has an available floating-point execution unit. Register files associated with the execution units are also included to store information instruction processing results. Exemplary execution units include a floating-point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoders 425 and 426 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

Memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
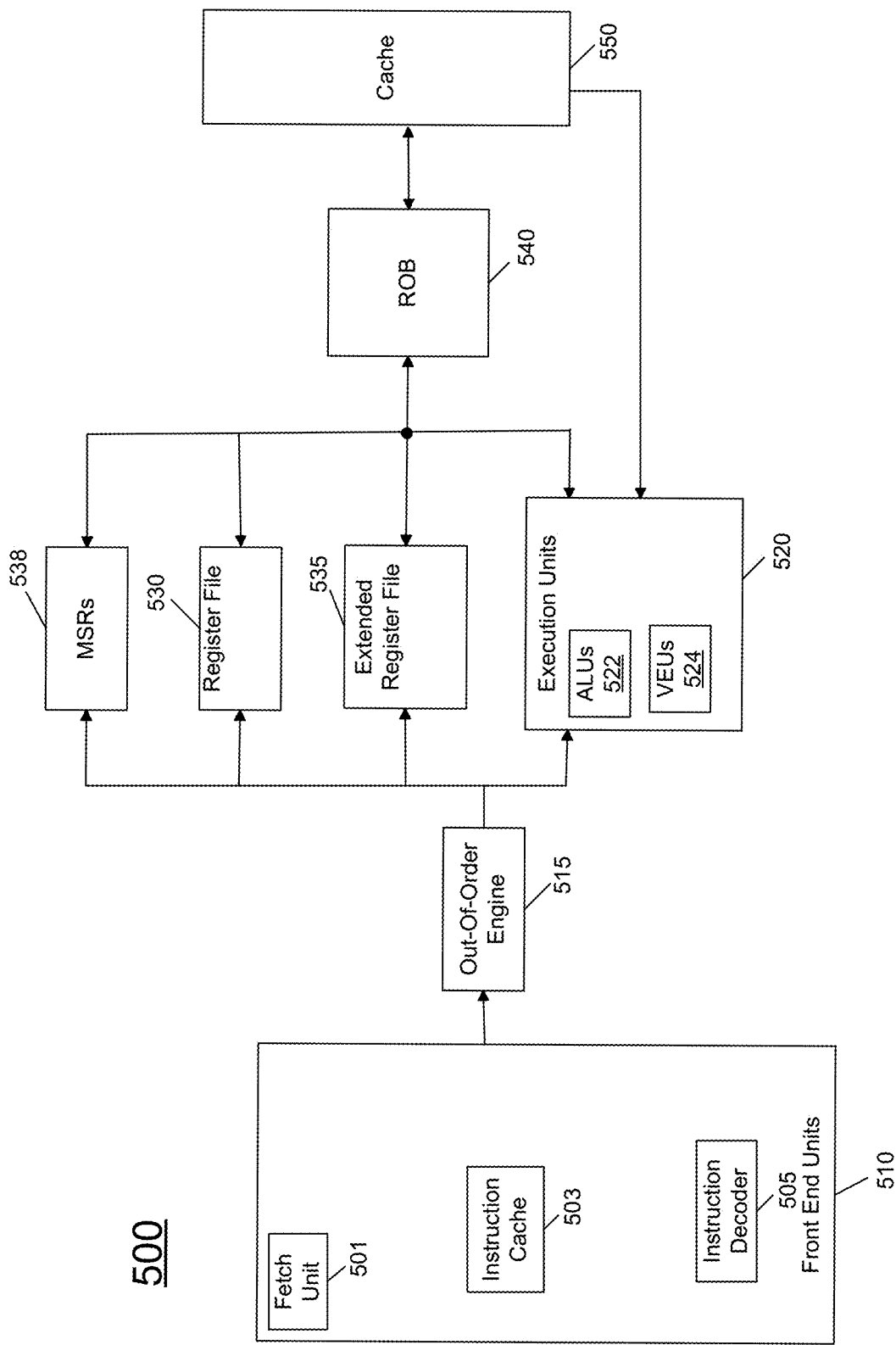
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating-point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low-level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand that the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
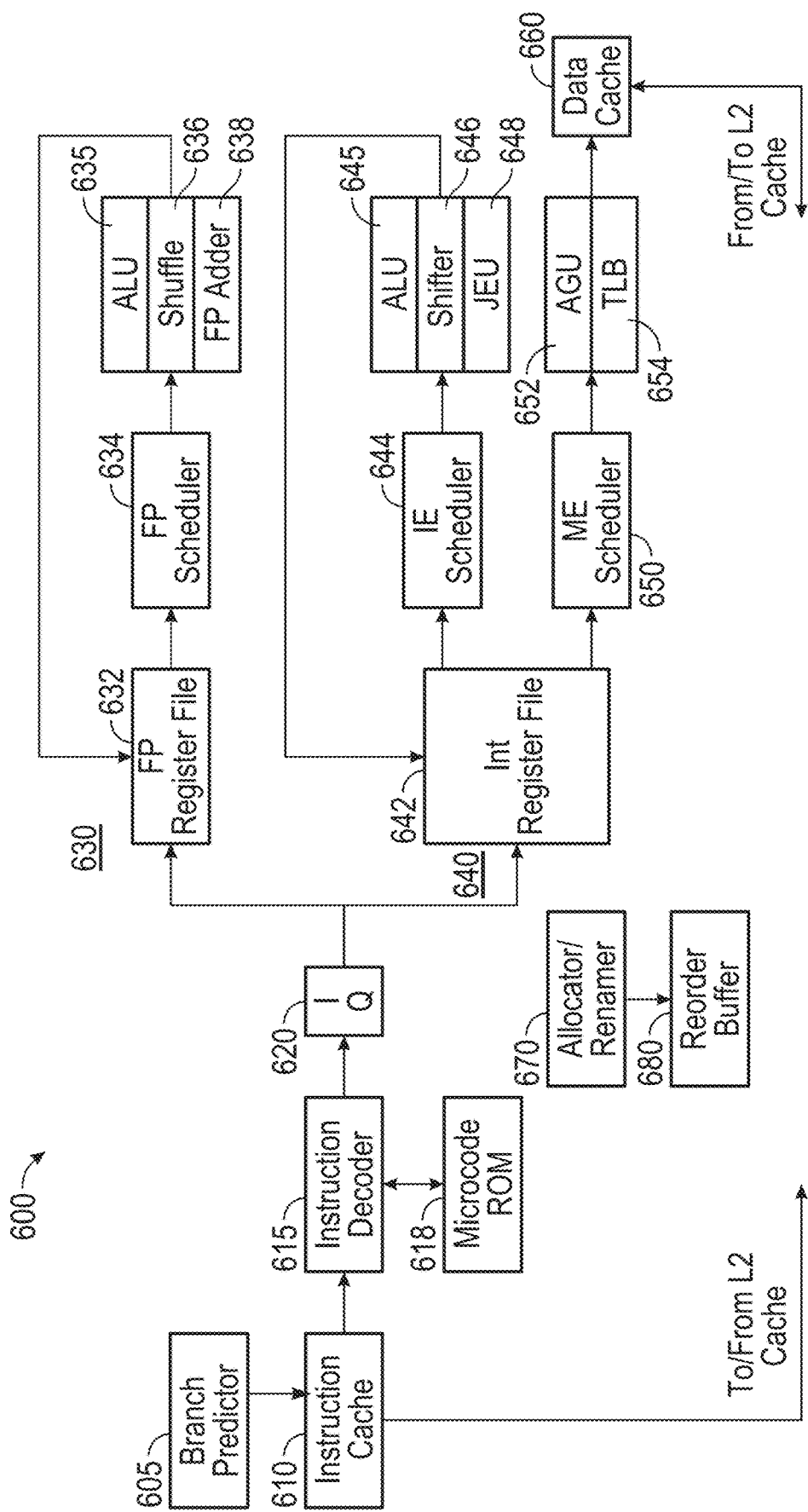
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. Microcode ROM 618 is coupled to instruction decoder 615.

A floating-point pipeline 630 includes floating point register file 632 which may include a plurality of architectural registers of a given bit with such as 128, 256 or 512 bits. Pipeline 630 includes floating-point scheduler 634 to schedule instructions for execution on one of multiple execution units of the pipeline. In the embodiment shown, such execution units include ALU 635, shuffle unit 636, and floating-point adder 638. In turn, results generated in these execution units may be provided back to buffers and/or registers of register file 632. Of course, understand that while shown with these few example execution units, additional or different floating-point execution units may be present in another embodiment.

An integer pipeline 640 also may be provided. In the embodiment shown, pipeline 640 includes integer register file 642 which may include a plurality of architectural registers of a given bit such as 128 or 256 bits. Pipeline 640 includes integer scheduler 644 to schedule instructions for execution on one of multiple execution units of the pipeline. In the embodiment shown, such execution units include ALU 645, shifter unit 646, and jump execution unit 648. In turn, results generated in these execution units may be provided back to buffers and/or registers of register file 642. Of course, understand that while shown with these few example execution units, additional or different integer execution units may be present in another embodiment.

A memory execution scheduler 650 may schedule memory operations for execution in address generation unit 652, which is also coupled to TLB 654. As seen, these structures may couple to data cache 660, which may be L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIG. 5 and FIG. 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
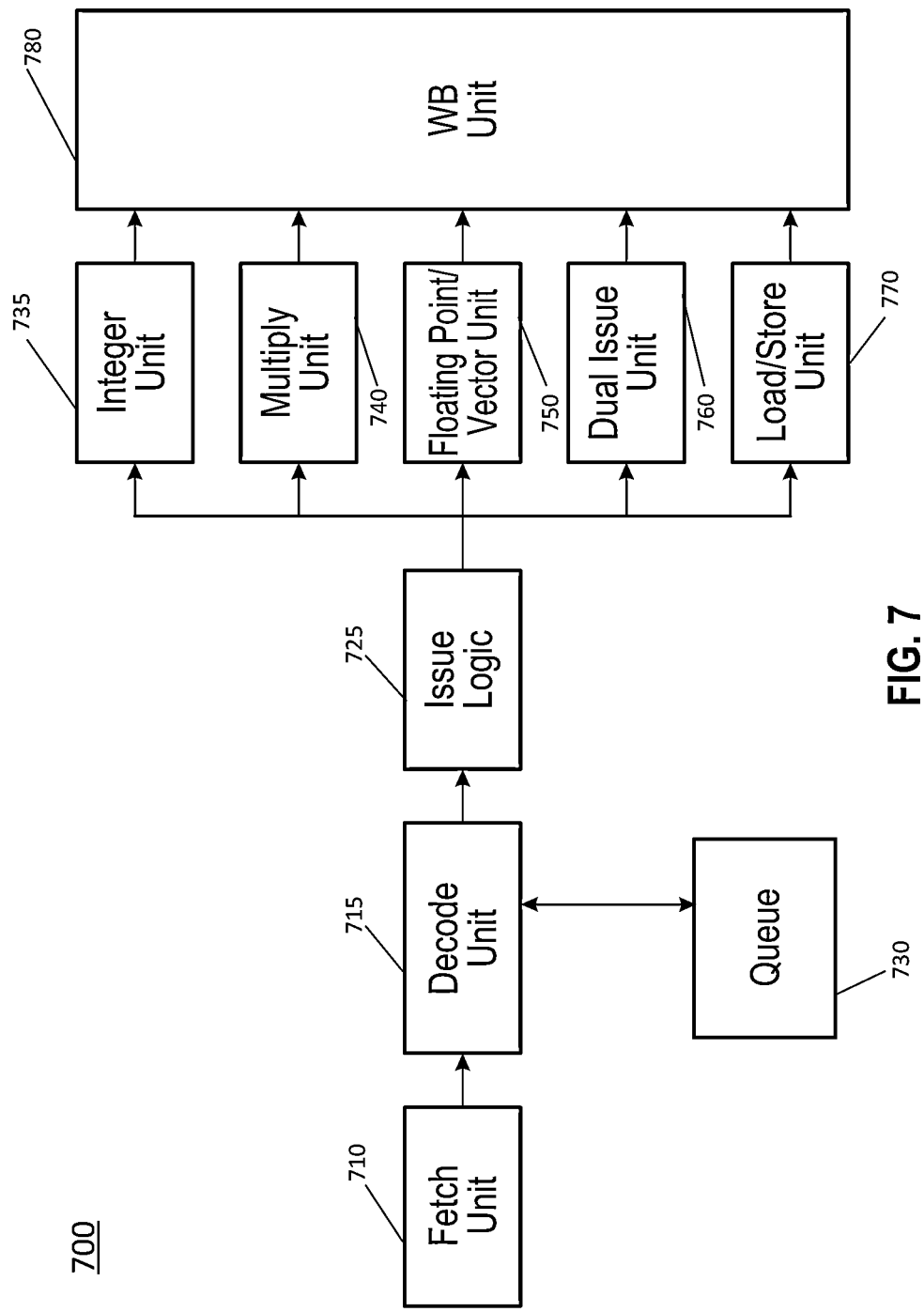
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, CA. In an implementation, an 8-stage pipeline may be provided that is configured to execute both 32-bit and 64-bit code. Core 700 includes fetch unit 710 that is configured to fetch instructions and provide them to decode unit 715, which may decode the instructions, e.g., macro-instructions of a given ISA such as an ARMv8 ISA. Note further that queue 730 may couple to decode unit 715 to store decoded instructions. Decoded instructions are provided to issue logic 725, where the decoded instructions may be issued to a given one of multiple execution units.

With further reference to FIG. 7, issue logic 725 may issue instructions to one of multiple execution units. In the embodiment shown, these execution units include integer unit 735, multiply unit 740, floating-point/vector unit 750, dual issue unit 760, and load/store unit 770. The results of these different execution units may be provided to writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
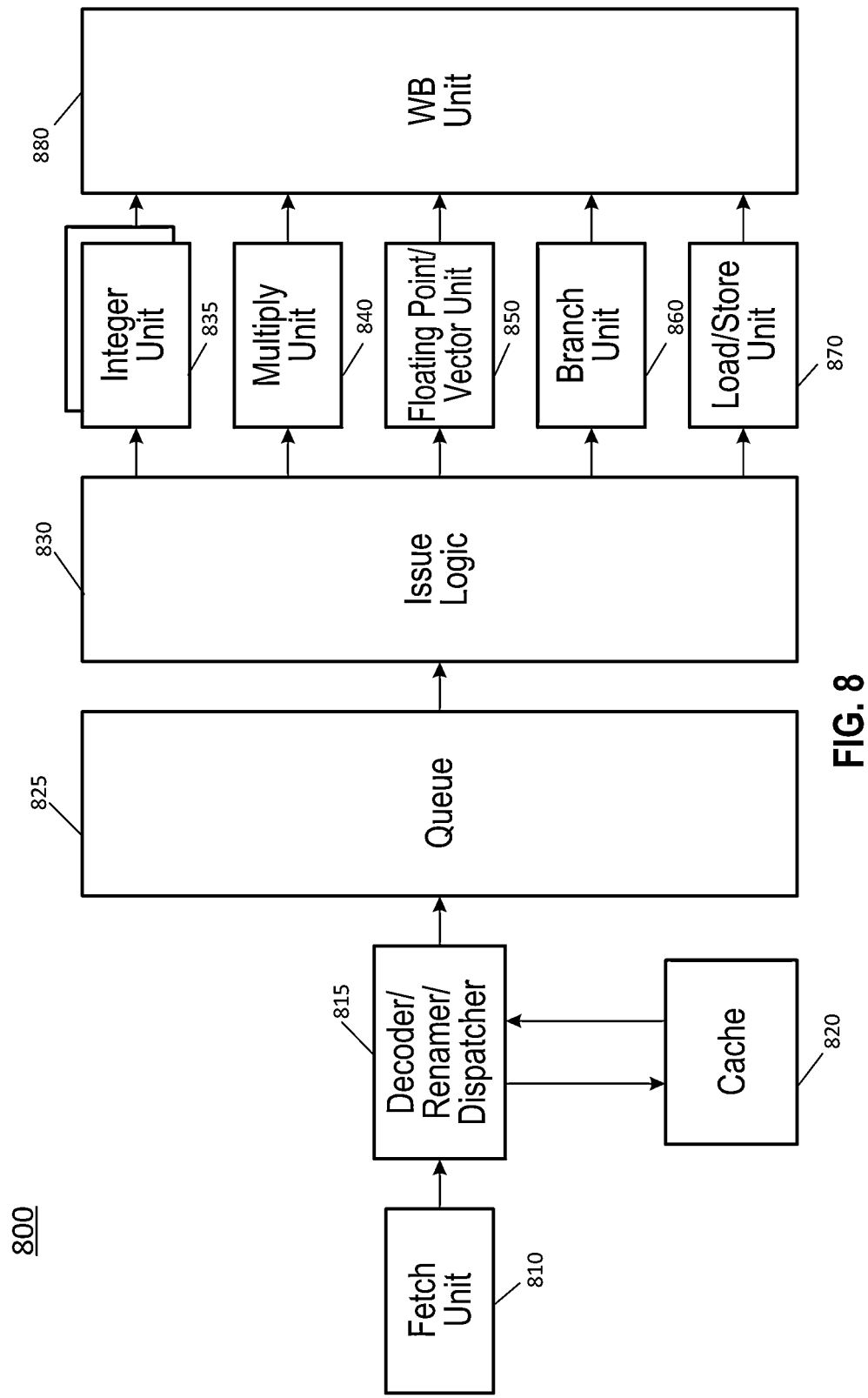
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, core 800 may include a multi-stage multi-issue out-of-order pipeline to execute at very high-performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoder/renamer/dispatcher 815 is coupled to cache 820. Decoded instructions may be stored in queue 825. Note that while a single queue structure is shown for ease of illustration in FIG. 8, understand that separate queues may be provided for each of the multiple different types of execution units.

Also shown in FIG. 8 is issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, multiply unit 840, floating-point/vector unit 850, a branch unit 860, and load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIG. 7 and FIG. 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
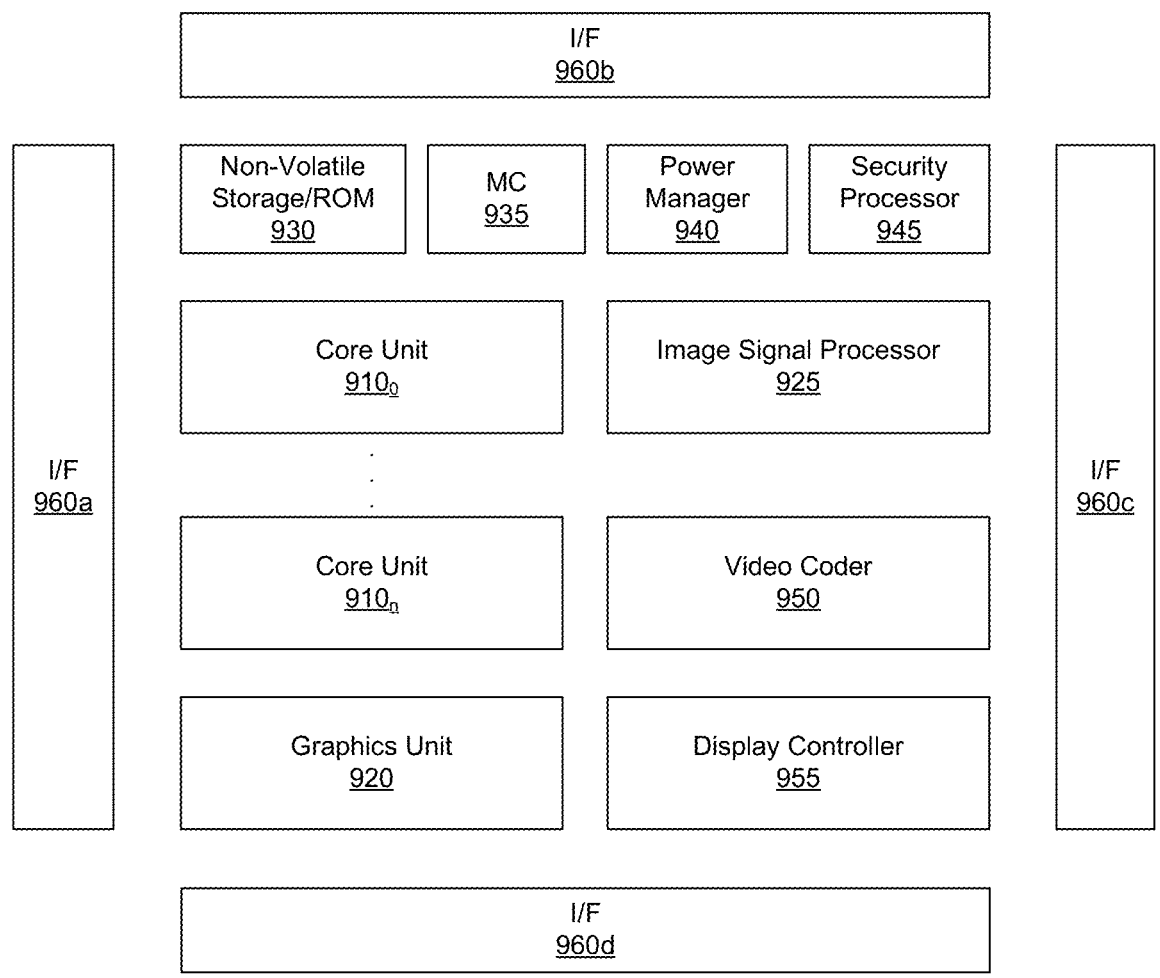
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be an SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, CA, an ARM-based design from ARM Holdings, Ltd. or licensee thereof or a MIPS-based design from MIPS Technologies, Inc. of Sunnyvale, CA, or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); an MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, video coder 950 may perform coding operations including encoding and decoding for video information, e.g., providing hardware acceleration support for high definition video content. Display controller 955 further may be provided to accelerate display operations including providing support for internal and external displays of a system. In addition, security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
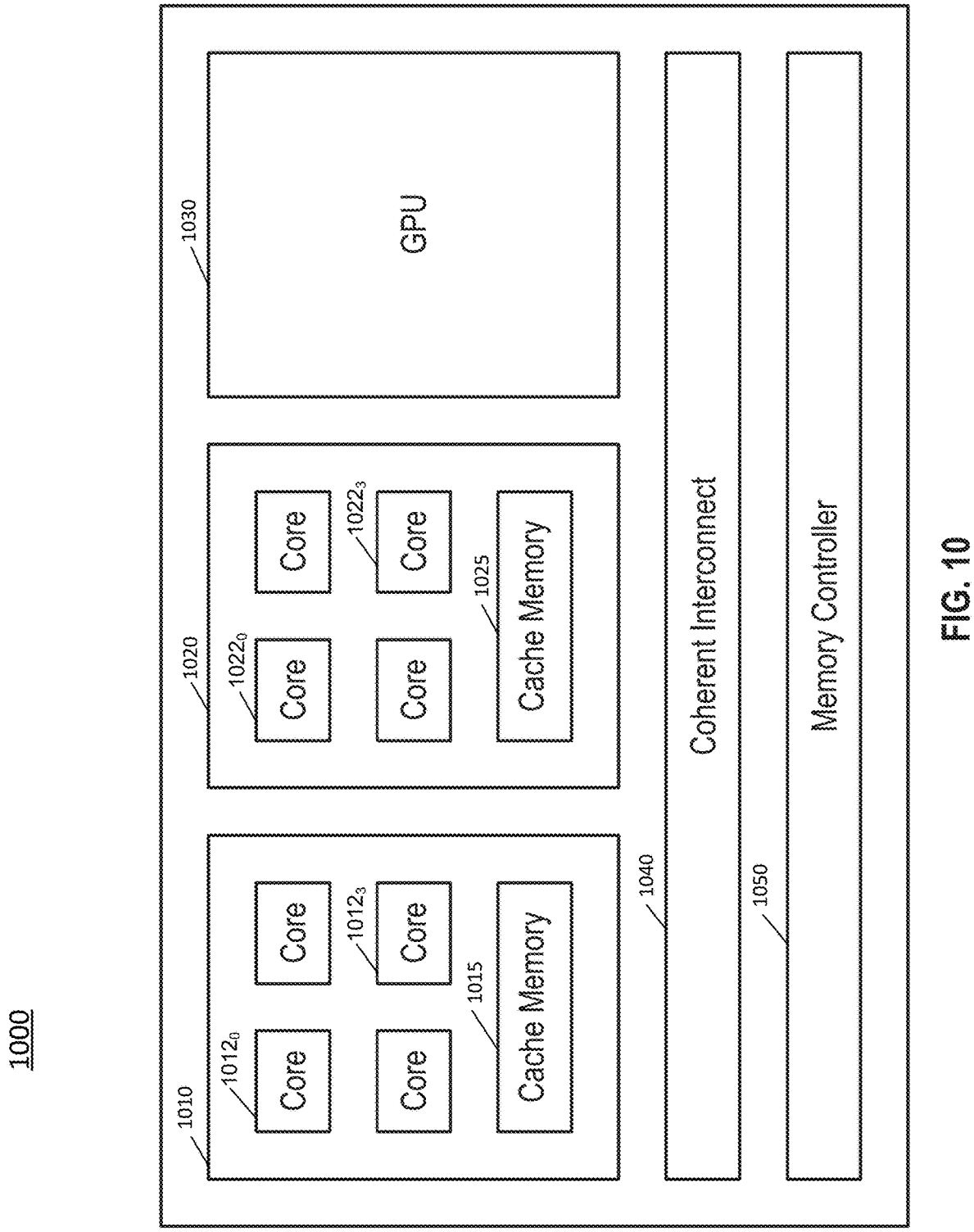
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
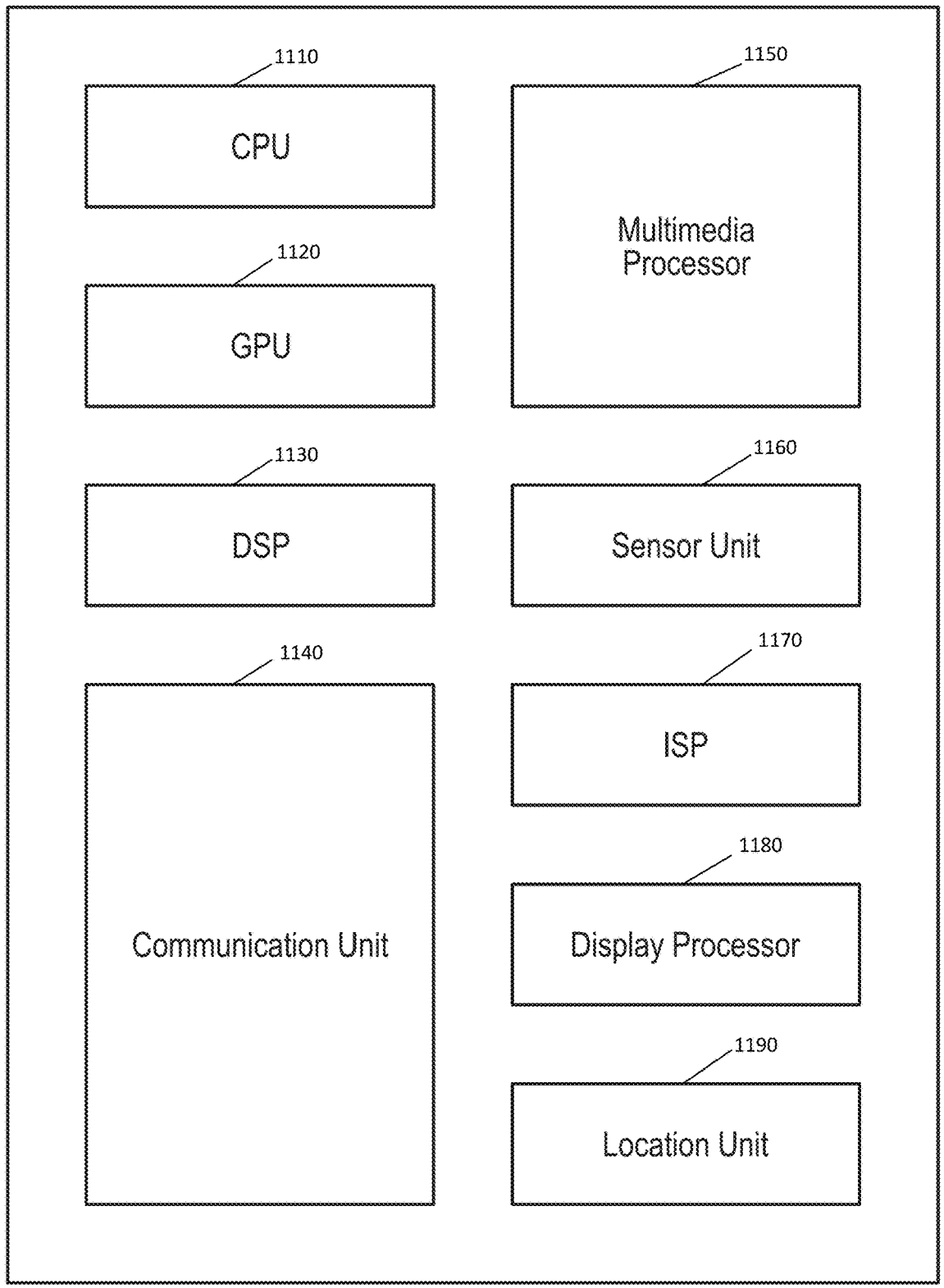
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, GPU domain 1120 is provided to perform advanced graphics processing in one or more GPUs to handle graphics and compute APIs. DSP unit 1130 may provide one or more low power DSPs for handling low-power multimedia applications such as music playback, audio/video and so forth, in addition to advanced calculations that may occur during execution of multimedia instructions. In turn, communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. Sensor unit 1160 may include a plurality of sensors and/or a sensor controller to interface to various off-chip sensors present in a given platform. Image signal processor 1170 may be provided with one or more separate ISPs to perform image processing with regard to captured content from one or more cameras of a platform, including still and video cameras.

Display processor 1180 may provide support for connection to a high definition display of a given pixel density, including the ability to wirelessly communicate content for playback on such display. Still further, location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
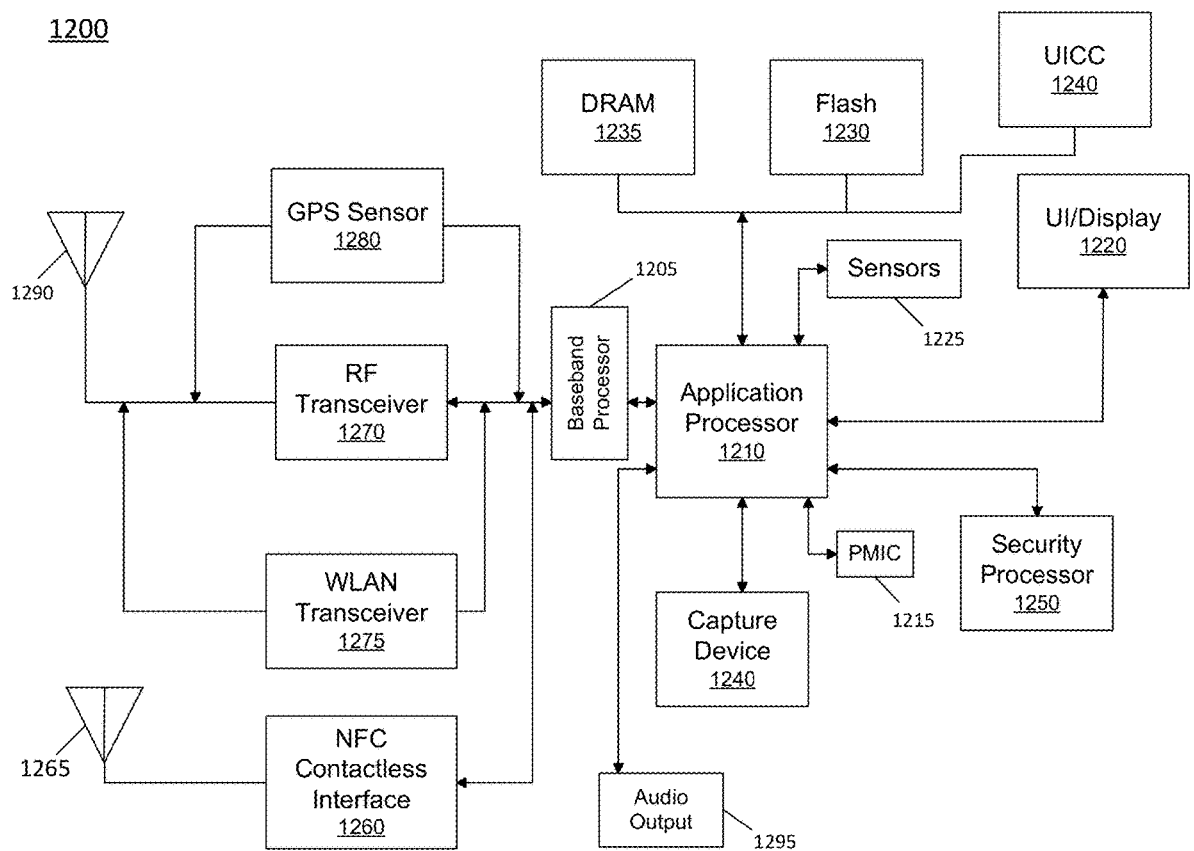
FIG. 12 is a block diagram of an example system with which embodiments can be used.

Referring now to FIG. 12, shown is a block diagram of an example system with which embodiments can be used. As seen, system 1200 may be a smartphone or other wireless communicator. Baseband processor 1205 is configured to perform various signal processing with regard to communication signals to be transmitted from or received by the system. In turn, baseband processor 1205 is coupled to application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to user interface/display 1220, e.g., a touch screen display. In addition, application processor 1210 may couple to a memory system including a non-volatile memory, namely flash memory 1230 and a system memory, namely dynamic random-access memory (DRAM) 1235. As further seen, application processor 1210 further couples to capture device 1240 such as one or more image capture devices that can record video and/or still images.

Still referring to FIG. 12, universal integrated circuit card (UICC) 1240 comprising a subscriber identity module and possibly a secure storage and cryptoprocessor is also coupled to application processor 1210. System 1200 may further include security processor 1250 that may couple to application processor 1210. Plurality of sensors 1225 may couple to application processor 1210 to enable input of a variety of sensed information such as accelerometer and other environmental information. Audio output device 1295 may provide an interface to output sound, e.g., in the form of voice communications, played or streaming audio data and so forth.

As further illustrated, near field communication (NFC) contactless interface 1260 is provided that communicates in an NFC near field via NFC antenna 1265. While separate antennae are shown in FIG. 12, understand that in some implementations one antenna or a different set of antennae may be provided to enable various wireless functionality.

Power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, radio frequency (RF) transceiver 1270 and wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition, GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
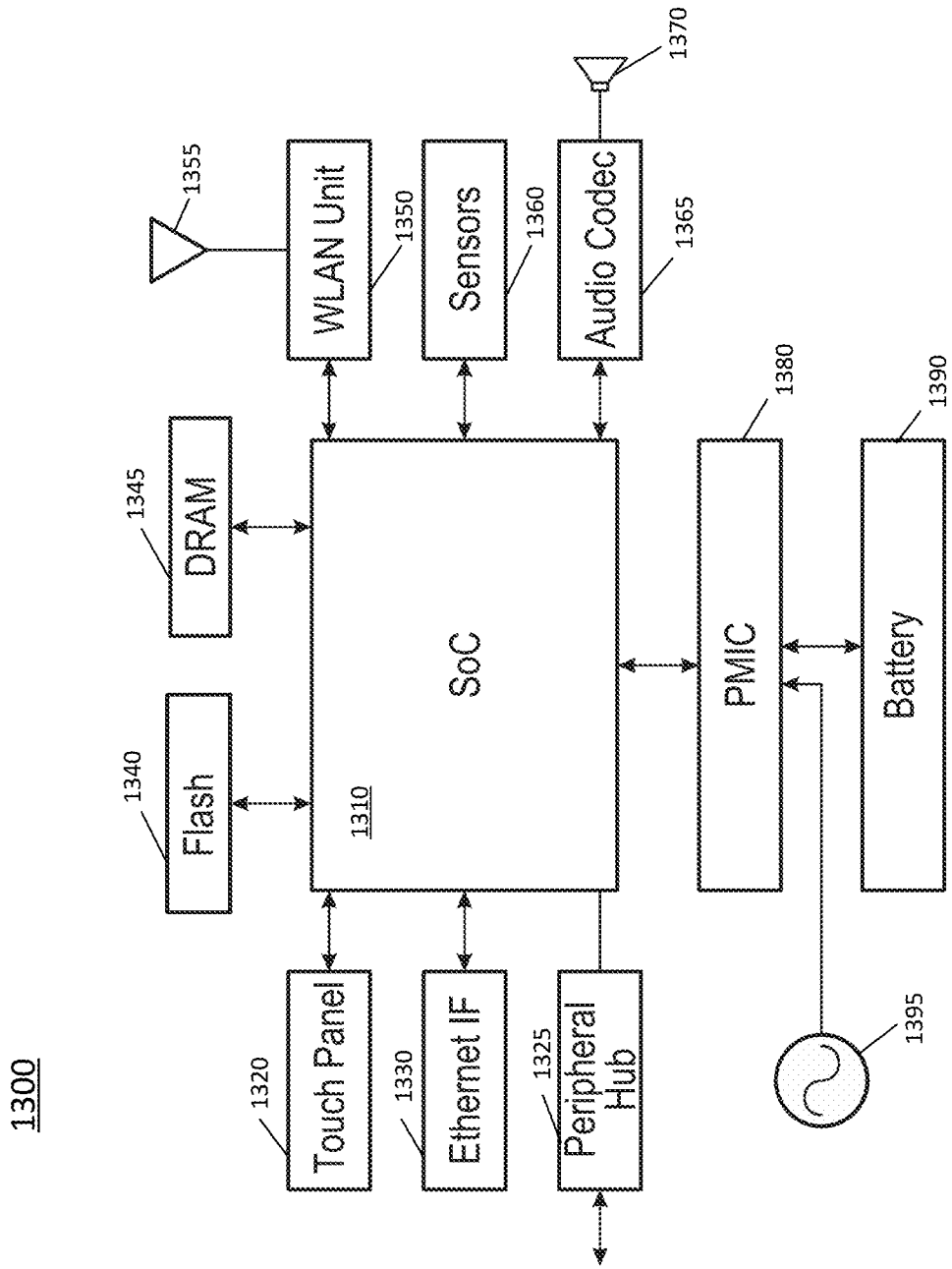
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, an SoC 1310 is present and may be configured to operate as an application processor for the device.

A variety of devices may couple to SoC 1310. In the illustration shown, a memory subsystem includes flash memory 1340 and DRAM 1345 coupled to SoC 1310. In addition, touch panel 1320 is coupled to SoC 1310 to provide display capability and user input via touch, including provision of a virtual keyboard on a display of touch panel 1320. To provide wired network connectivity, SoC 1310 couples to Ethernet interface 1330. Peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, WLAN unit 1350 is coupled to SoC 1310 and in turn to antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, audio codec 1365 is coupled to SoC 1310 to provide an interface to an audio output device 1370. Of course, understand that while shown with this particular implementation in FIG. 13, many variations and alternatives are possible.

Figure 14:
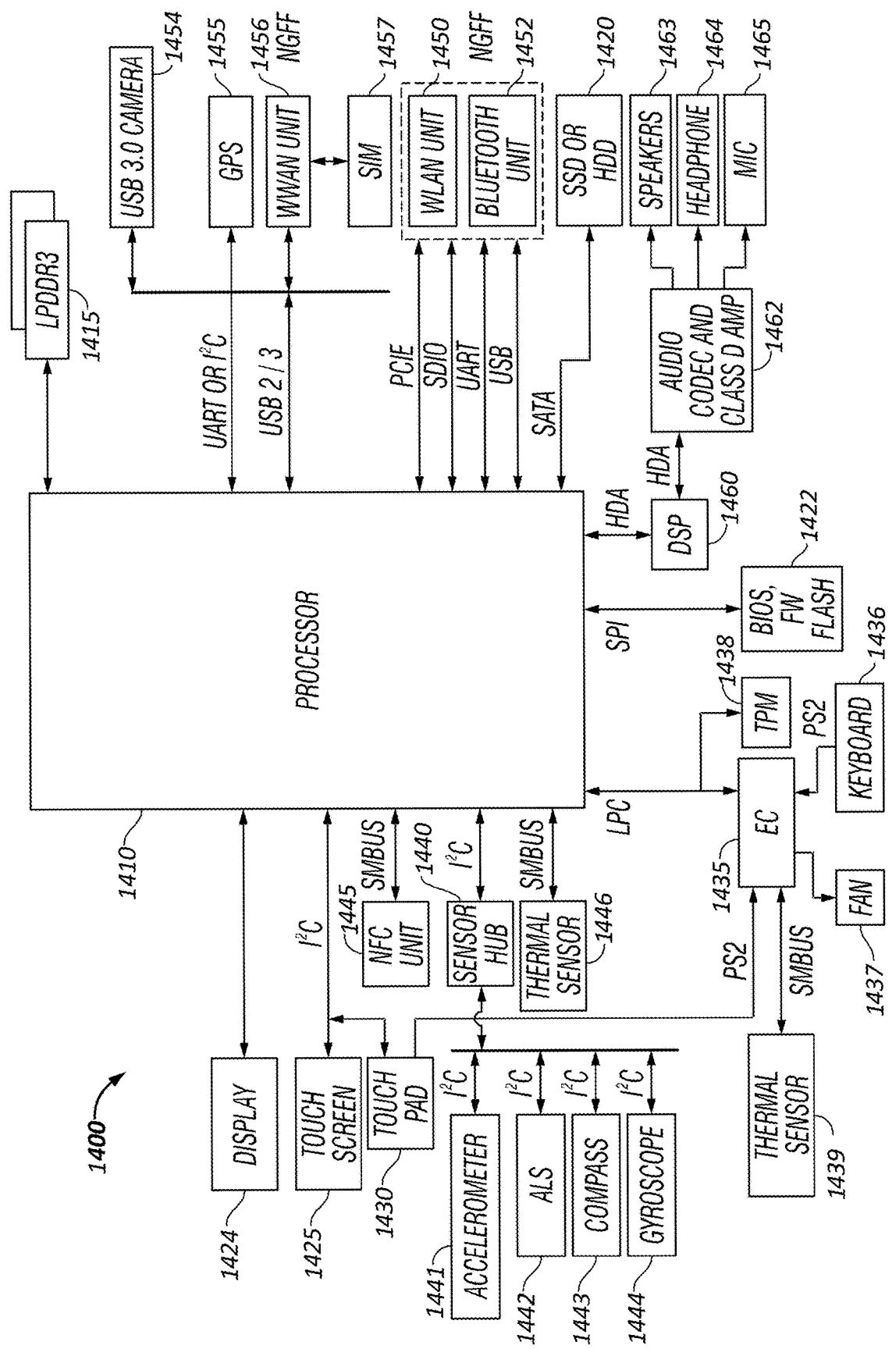
FIG. 14 is a block diagram of a representative computer system.

Referring now to FIG. 14, shown is a block diagram of a representative computer system such as notebook, Ultrabook™ or other small form factor system. Processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of system 1400. As one example, processor 1400 is implemented as an SoC.

Processor 1410, in one embodiment, communicates with system memory 1415. As an illustrative example, the system memory 1415 is implemented via multiple memory devices or modules to provide for a given amount of system memory.

To provide for persistent storage of information such as data, applications, one or more operating systems and so forth, mass storage 1420 may also couple to processor 1410. In various embodiments, to enable a thinner and lighter system design as well as to improve system responsiveness, this mass storage may be implemented via an SSD or the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is display 1424 which may be a high definition LCD or LED panel that further provides for touch screen 1425. In one embodiment, display 1424 may be coupled to processor 1410 via a display interconnect that can be implemented as a high-performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through sensor hub 1440, e.g., via an I²C interconnect. In the embodiment shown in FIG. 14, these sensors may include accelerometer 1441, ambient light sensor (ALS) 1442, compass 1443 and gyroscope 1444. Other environmental sensors may include one or more thermal sensors 1446 which in some embodiments couple to processor 1410 via a system management bus (SMBus).

Also seen in FIG. 14, various peripheral devices may couple to processor 1410 via a low pin count (LPC) interconnect. In the embodiment shown, various components can be coupled through embedded controller 1435. Such components can include keyboard 1436 (e.g., coupled via a PS2 interface), fan 1437, and thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via an NFC unit 1445 which may communicate, in one embodiment with processor 1410 via an SMBus. Note that via this NFC unit 1445, devices in close proximity to each other can communicate.

As further seen in FIG. 14, additional wireless units can include other short-range wireless engines including WLAN unit 1450 and Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via WWAN unit 1456 which in turn may couple to subscriber identity module (SIM) 1457. In addition, to enable receipt and use of location information, GPS module 1455 may also be present. Note that in the embodiment shown in FIG. 14, WWAN unit 1456 and an integrated capture device such as camera module 1454 may communicate via a given link.

Integrated camera module 1454 can be incorporated in a lid. To provide for audio inputs and outputs, an audio processor can be implemented via digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463, which may be implemented within the chassis. Similarly, amplifier and CODEC 1462 can be coupled to receive audio inputs from microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to headphone jack 1464. Although shown with these particular components in the embodiment of FIG. 14, understand the scope of the present invention is not limited in this regard.

Figure 15:
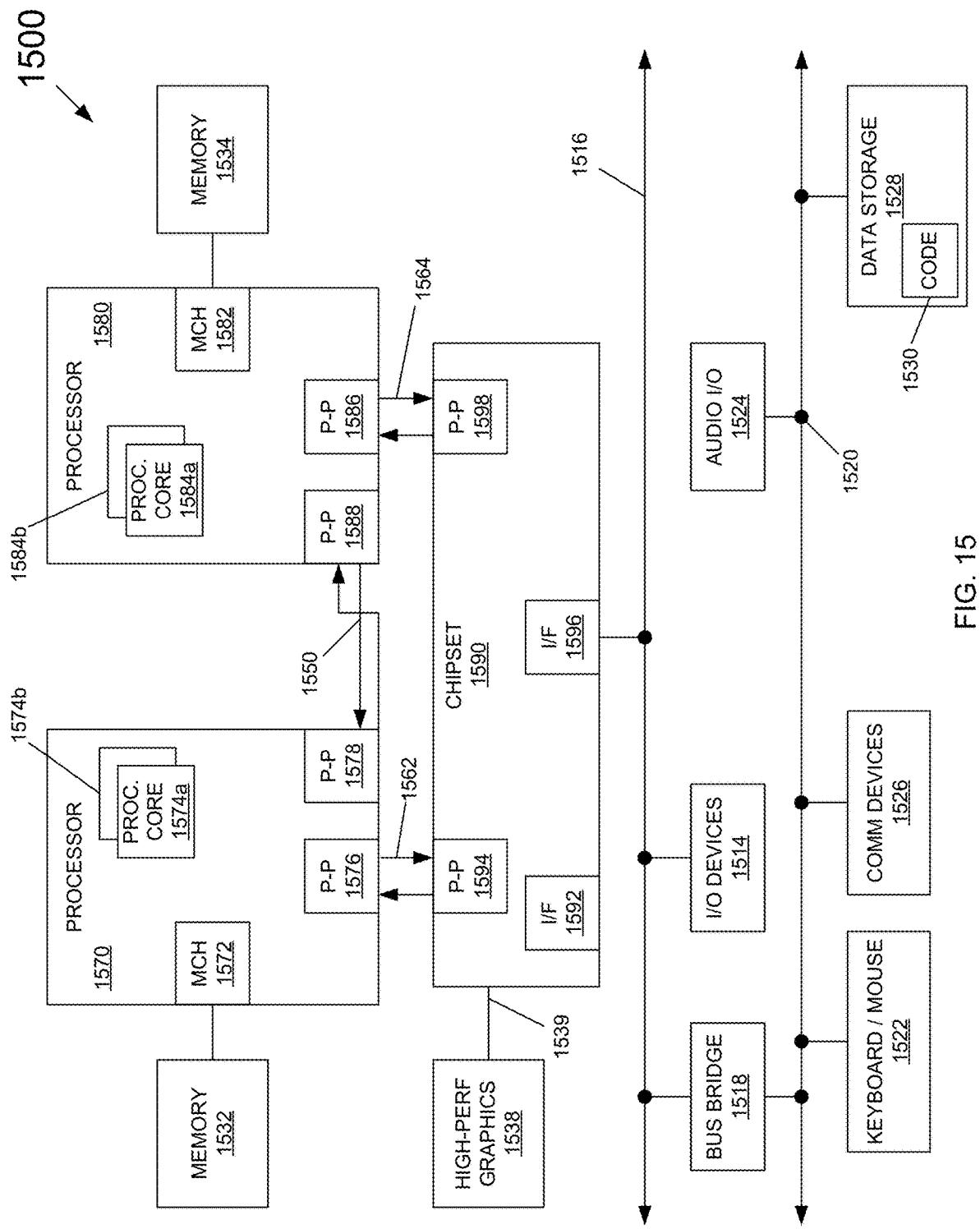
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes first processor 1570 and second processor 1580 coupled via point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes memory controller hub (MCH) 1572 and point-to-point (P-P) interfaces 1576 and 1578. Similarly, second processor 1580 includes MCH 1582 and P-P interfaces 1586 and 1588. As shown in FIG. 15, MCHs 1572 and 1582 couple the processors to respective memories, namely memory 1532 and memory 1534, which may be portions of system memory (e.g., DRAM) locally attached to the respective processors. First processor 1570 and second processor 1580 may be coupled to chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high-performance graphics engine 1538, by P-P interconnect 1539. In turn, chipset 1590 may be coupled to first bus 1516 via interface 1596. As shown in FIG. 15, various input/output (I/O) devices 1514 may be coupled to first bus 1516, along with bus bridge 1518 which couples first bus 1516 to second bus 1520. Various devices may be coupled to second bus 1520 including, for example, keyboard/mouse 1522, communication devices 1526 and data storage unit 1528 such as a disk drive or other mass storage device which may include code 1530, in one embodiment. Further, audio I/O 1524 may be coupled to second bus 1520. Embodiments can be incorporated into other types of systems including mobile devices such as a smart cellular telephone, tablet computer, netbook, Ultrabook™, or so forth.

Using an embodiment of the present invention, a base operating frequency (also referred to herein as a P1 frequency) which may be a maximum operating frequency at which all cores of a processor can be controlled to operate, may be maximized at thermal design power (TDP) levels across a variety of operating temperatures in the presence of high levels of inverse temperature dependency and low leakage process. Of course, understand that a processor may operate at opportunistic or turbo mode frequencies above this base level, when available power and thermal capacity exists. As used herein, thermal design power is a measure of an average power at which the processor can operate. In many implementations, this TDP can be measured in units of power, namely Watts (W). For example, a processor can be rated or specified to a TDP of 40 W. This means that on average, the processor can withstand a power consumption level of 40 W, and a given platform incorporating the processor is designed with this constraint with regard to thermal solution, power solution and so forth. But at any instant, its instantaneous power consumption level may be higher or lower than this TDP level, and the processor still is within its TDP limit.

In silicon device manufacturing processes that are optimized for low leakage current, if the process parameters are such that an operating voltage indicated for fault-free operation at a given operating frequency is to be increased as temperature decreases (defined as inverse temperature dependency (ITD)), the net power for running at the given operating frequency also increases as temperature decreases.

However, processors are typically marketed and specified for a platform design with a fixed maximum allowable average power limit or TDP limit, namely a static value independent of temperature and given base operating frequency at which most typical applications are expected to operate. Instead in embodiments described herein, to maintain a static (and maximized) base operating frequency, allowed power dissipation or TDP value may be dynamically controlled based at least in part on processor temperature such that a static and maximized base operating frequency may be maintained across an entire operating temperature range of a processor.

Processor temperature may be determined based on thermal information obtained from thermal sensors that monitor die temperature. In an embodiment, these thermal sensors may be periodically polled, and based at least in part on the determined temperature the maximum or allowable average power can be dynamically controlled. As will be described, in one embodiment, based on temperature information, a pre-configured power scaling factor may be obtained, and this scaling factor can be used to increase or decrease the allowable average power limit.

Embodiments thus may, based on a periodic sampling of die temperature, dynamically adjust the power limit value, which may in turn be provided as an input to a an energy budget management determination, to ensure that there is sufficient power available for all processing engines to continuously execute a baseline or TDP workload at a base operating frequency. The interval between power limit updates may be set such that the energy budget determination safely converges to a programmed limit before a new TDP limit input is provided. By increasing TDP levels at lower die temperature ranges, there is no increase in cooling requirements at the platform level. Therefore, from a thermal design point of view, there is no platform change to accommodate a higher TDP level that occurs only at lower die temperature levels.

Figure 16:
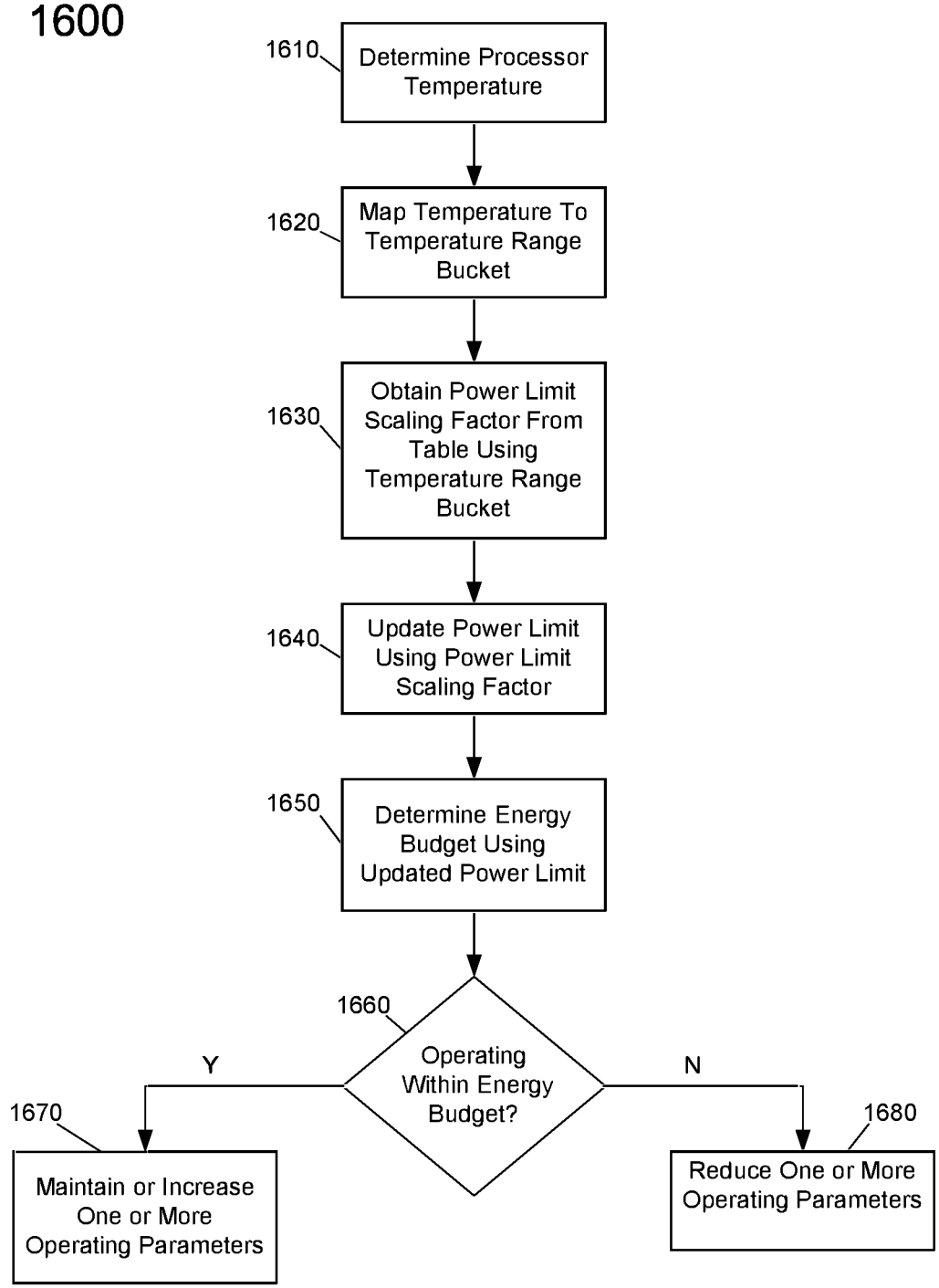
FIG. 16 is a flow diagram of a method in accordance with an embodiment of the present invention.

Referring now to FIG. 16, shown is a flow diagram of a method in accordance with an embodiment of the present invention. More specifically, method 1600 of FIG. 16 may be used to dynamically determine a maximum allowable average power limit (an updated TDP value) for a processor, and based on such value to determine an updated energy budget and potentially update one or more operating characteristics of the processor. Understand that in different embodiments, method 1600 may be executed by appropriate combinations of hardware, software, and/or firmware, including an energy control unit having a control logic, or other power controller such as one or microcontrollers of a processor. Of course, in other embodiments, dynamic adjustment of the allowed TDP may be performed in platform firmware agents such a manageability engine, a service processor or so forth.

As seen, method 1600 begins at block 1610 by determining a processor temperature. Understand that various thermal sensors may be associated with different cores and other logic of the processor and may communicate thermal information, e.g., on a regular basis to the PCU. Understand that the granularity of this thermal information may vary, but in any case, a resulting processor temperature is determined. Note that in some cases a single overall processor temperature may be determined, while in other cases a temperature determination may be made on a finer-grained level, such as at a core level or other portion of a processor.

Next at block 1620 the temperature can be mapped to a temperature range bucket. For example, a plurality of buckets may be configured for the processor, each corresponding to a temperature range. In a simple case, two buckets may be provided, namely a first or low bucket when processor temperature is below a threshold temperature and a second or high bucket when processor temperature is above this threshold temperature. Of course, in other cases more than two such buckets may be provided. Next a power limit scaling factor may be obtained from a table using the determined temperature range bucket (block 1630). For example, in an embodiment the temperature range bucket (e.g., an integer value such as zero or one in the case of two temperature buckets) may be used as an index to access a given entry of this power limit scaling factor table. Accordingly, the given power limit scaling factor present in the appropriate entry of the table may be obtained. Note that each entry in the table may include a power limit scaling factor (which in an embodiment may be a coefficient value) and an index field, which is used to access the given entry based on the temperature range bucket.

Still referring to FIG. 16, next at block 1640 a power limit may be updated using this power limit scaling factor. Various manners of updating the power limit may occur. For example, in one embodiment the power limit may be updated according to the following equation:

$$\text{Updated Power Limit} = (\text{Configured Power Limit}) * (1 + \text{Power Limit Scaling Factor}) \quad [\text{EQ. 1}]$$

where Configured Power Limit is a specified TDP value, which may be obtained from a configuration storage, and which may be an OS, BIOS or platform management entity-controlled value, and Power Limit Scaling Factor can be obtained from the table as described above.

Still with reference to FIG. 16, next an energy budget may be determined using this updated power limit (block 1650). While various manners of determining or calculating an energy budget can occur in different embodiments, in one embodiment an energy budget may be determined according to the following equation:

$$E_n = E_{n-1} * \text{alpha} + (1 - \text{alpha}) * (\text{Power\_Limit} * \text{deltaT} - \text{Energy}) \quad [\text{EQ. 2}]$$

where $E_n$=energy budget for the current (Nth) evaluation instant (which can be measured in Joules); $E_{n-1}$=energy budget carried forward from the previous evaluation instant (which can be measured in Joules); Power_Limit=Updated Power Limit or Configured Power Limit (e.g., the above-determined TDP value); deltaT=evaluation interval at which an energy budget is computed, which in one embodiment may be approximately 1 millisecond (ms); Energy=energy consumed during the previous evaluation interval, which can be measured in Joules. In one embodiment, energy can be estimated based on counters that trace various microarchitectural activity. For example, an energy value can be associated with each micro-operation retiring, or each cache access. Then based on these events occurring over the time interval, energy consumed can be determined. In another embodiment, energy can be obtained from reading external current and voltage monitoring sensors such as current monitoring circuitry implemented in a voltage regulator; and alpha=rate of energy budget decay, which can be a function of the thermal resistance of a heatsink and cooling solution of the platform. In general, an alpha value can vary inversely with the selected deltaT. Where the deltaT is relatively small, e.g., 1 ms, the alpha value may be higher, and vice-versa.

With this determined energy budget, in cases where the processor is operating below a thermal threshold it is possible to operate at a higher power level than the processor's configured TDP value, in light of a greater updated power limit and accordingly greater energy budget. As such, the processor may execute at higher power levels that fall within this higher constraint level in such conditions.

Still in reference to FIG. 16, it is further possible to make a determination as to whether operation of the processor is within this determined the energy budget (diamond 1660). As an example, power allocations to the various cores and other logic of the processor may be determined and compared to this updated energy budget. If it is determined that the processor is operating within the energy budget, control passes to block 1670 where one or more current operating parameters of the processor (such as operating voltage and/or frequency, among others) may be maintained or even increased. Otherwise, if it is determined that the processor is not operating within the determined energy budget, control passes to block 1680, where one or more operating parameters may be appropriately reduced to enable the processor to operate at a power level within the energy budget. Understand while shown at this high level in the embodiment of FIG. 16, many variations and alternatives are possible.

Figure 17:
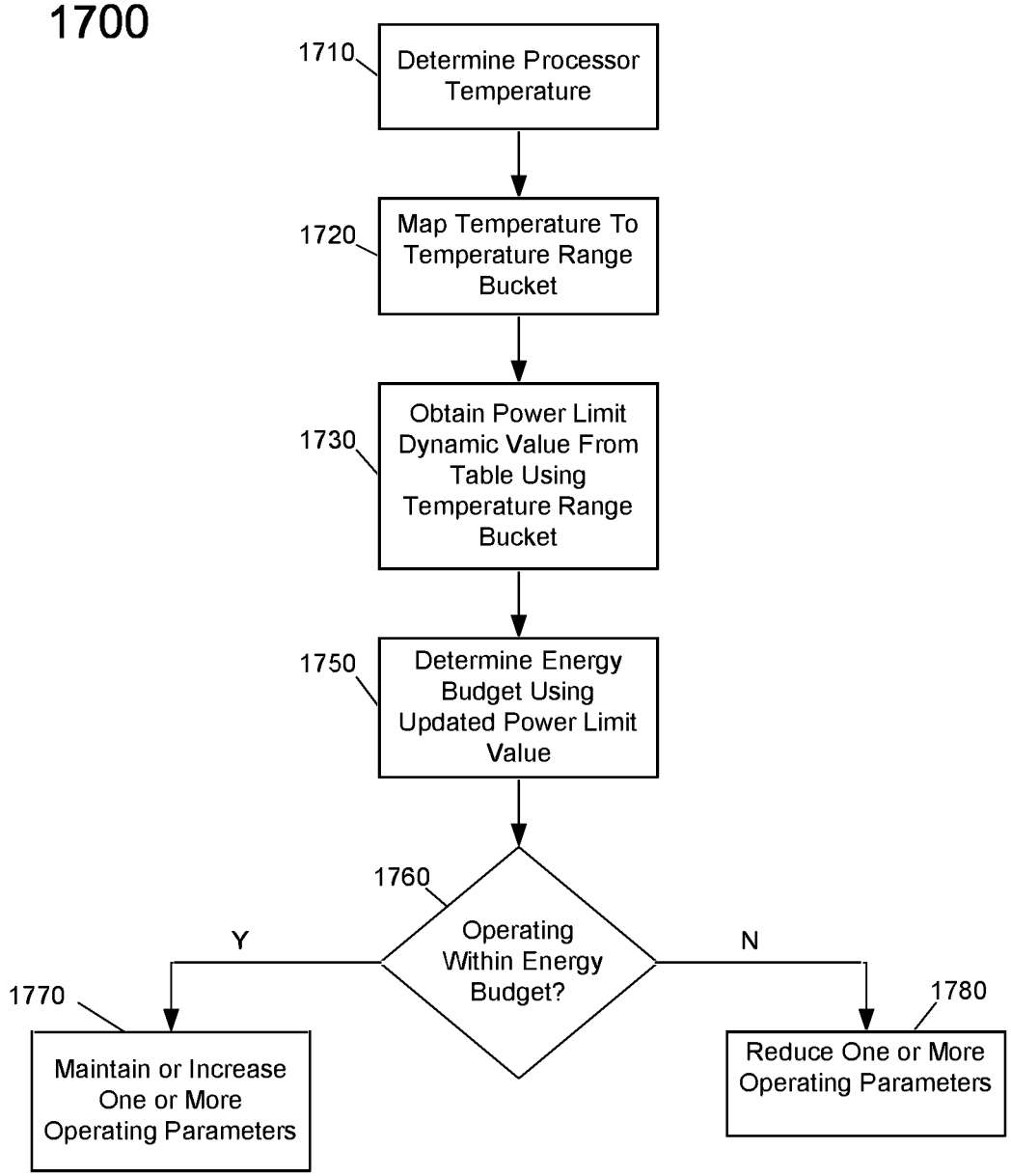
FIG. 17 is a flow diagram of a method in accordance with another embodiment of the present invention.

Referring now to FIG. 17, shown is a flow diagram of a method in accordance with another embodiment of the present invention. More specifically, method 1700 of FIG. 17 is another manner of dynamically determining a maximum allowable average power limit for a processor. Method 1700 similarly may be executed by appropriate combinations of hardware, software, and/or firmware, as described above.

As seen, method 1700 begins at block 1710 by determining a processor temperature, as discussed above. Next at block 1720 the temperature can be mapped to a temperature range bucket. Next a dynamic power limit value may be obtained from a table using the determined temperature range bucket (block 1730). Note, here the table may be configured to include entries each having a different power limit associated with a given temperature range and an index field, which is used to access the given entry based on the temperature range bucket.

Still with reference to FIG. 17, next an energy budget may be determined using this obtained power limit (block 1750), e.g., as discussed above regarding Equation 2. Next, a determination may be made as to whether operation of the processor is within this determined the energy budget (diamond 1760). If it is determined that the processor is operating within the energy budget, control passes to block 1770 where one or more current operating parameters of the processor may be maintained or even increased. Instead if it is determined that the processor is not operating within the determined energy budget, control passes to block 1780, where one or more operating parameters may be appropriately reduced to enable the processor to operate at a power level within the energy budget. Understand while shown at this high level in the embodiment of FIG. 17, many variations and alternatives are possible.

Using an embodiment, a workload thus may be executed at various temperature points across a thermal operating range of the processor, while a base operating frequency remains constant and average power consumption varies. In this way, a processor manufacturer can maximize base operating frequency of processor products without specifying a higher TDP power value across operating temperature range. Stated another way, while a processor manufacturer specifies at first TDP value (e.g., 30 W), the processor itself may dynamically allow for operation at a higher TDP value (e.g., 35 W) when temperature conditions (e.g., temperature below a threshold) allow.

Figure 19:
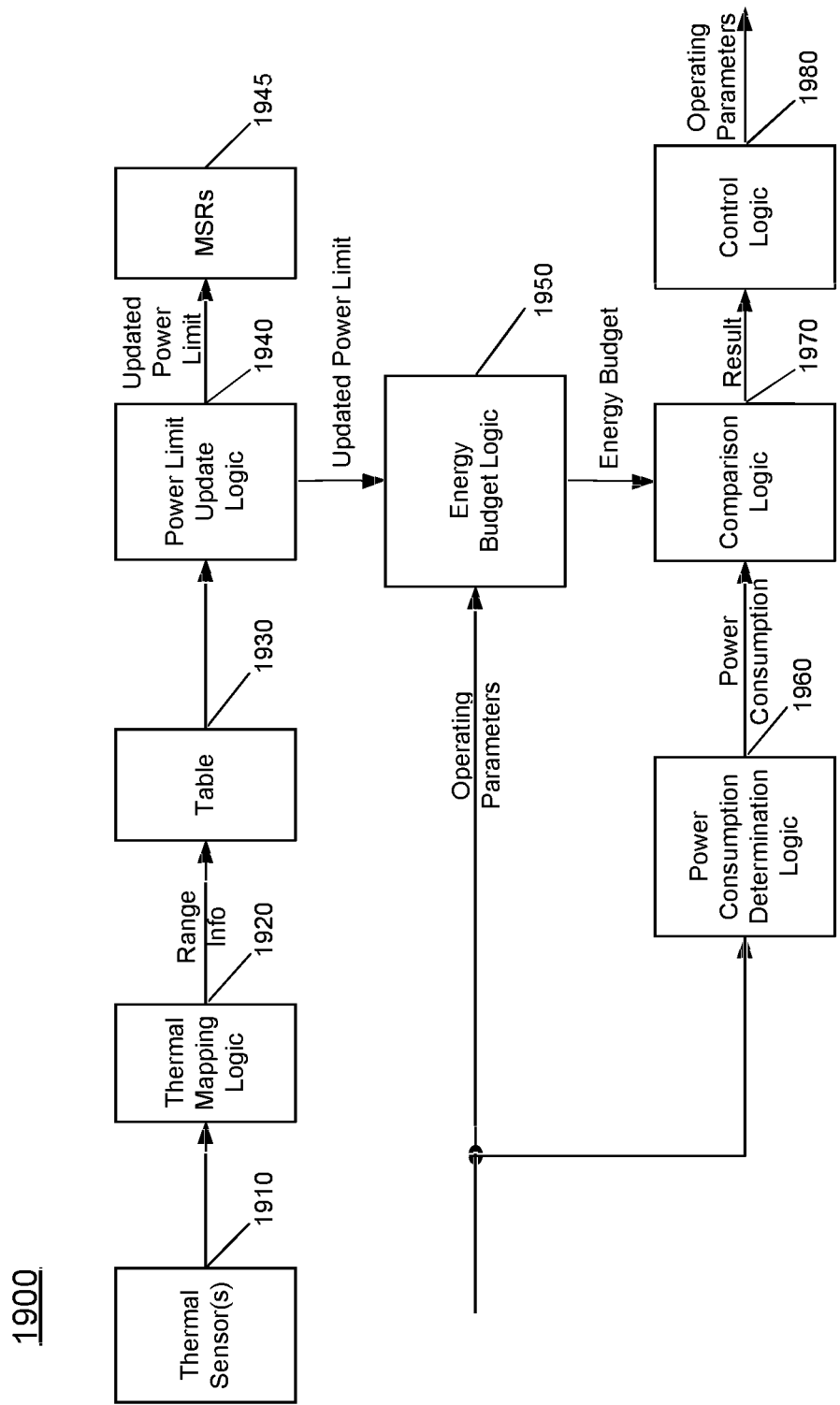
FIG. 19 is a block diagram of a control hardware logic in accordance with an embodiment.

Referring now to FIG. 19, shown is a block diagram of a control hardware logic in accordance with an embodiment. As seen in FIG. 19, hardware logic 1900 may include various constituent components or logic. While in some cases such logic may take the form of specialized hardware or combinations of hardware, software and/or firmware, in other cases the hardware logic may be implemented at least in part using hardware of a general-purpose processor, microcontroller or so forth. In one particular embodiment, hardware logic 1900 may be implemented as control logic incorporated within a PCU or other power controller of a processor.

In the embodiment shown, logic 1900 is adapted to receive information from one or more thermal sensors 1910. In an embodiment, each of one or more cores may include or be associated with one or more thermal sensors. In addition, additional locations of a processor die may include one or more thermal sensors. As seen, this thermal information is provided to thermal mapping logic 1920. Using a temperature value (e.g., an average of detected temperatures, a temperature of a particular sensor associated with one or more cores or so forth), an index may be made into this thermal mapping logic to thus map a current temperature metric of the processor to a particular range bucket.

This range information in turn may be provided to table 1930. Understand that table 1930 may take different forms in different implementations. In one case, table 1930 may include a plurality of entries each to store an updated power limit, where a particular entry may be accessed based on this range information. In another case, table 1930 may include a plurality of entries each to store a power limit scaling factor. In either case, the information obtained from table 1930 is provided to power limit update logic 1940. In general, logic 1940 may determine an updated power limit for the processor, based at least in part on thermal information.

In the embodiment shown, power limit update logic 1940 may provide this updated power limit to a given set of MSRs 1945, one of which may be a configuration register to store a TDP value. In an embodiment, power limit update logic 1940 may, upon update to a power limit perform an overwrite of a current TDP value stored in this MSR 1945 with the updated value.

Figure 18:
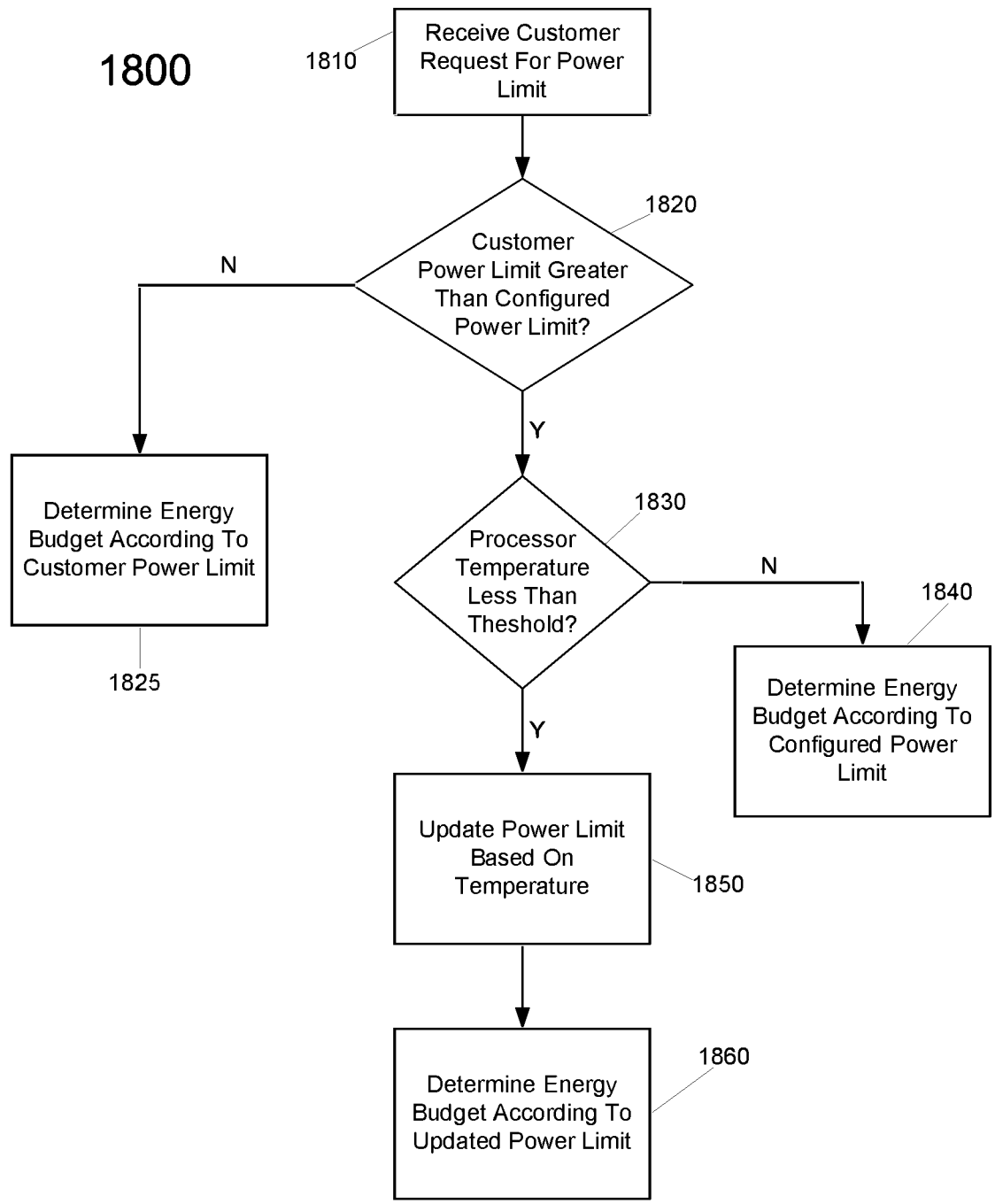
FIG. 18 is a flow diagram of a method for controlling a processor in accordance with an embodiment.

Referring now to FIG. 18, shown is a flow diagram of a method for controlling a processor in accordance with an embodiment. Understand that in different embodiments, method 1800 may be executed by appropriate combinations of hardware, software, and/or firmware, as discussed above. As seen, method 1800 begins by receiving a customer request for a particular power limit. Understand that as used herein, the term "customer" is used to refer to any of various entities that interact with a processor, including data center management entities, a platform designer or other entity. This customer request may be for a given processor power limit, e.g., in terms of Watts. Next at diamond 1820 it can be determined whether this customer power limit is greater than the configured power limit for the processor. This determination may be based on a comparison between the customer requested power limit and a processor configured power limit, which may be obtained from an appropriate configuration storage of the processor. If the value of the customer requested power limit is less than the value of the configured power limit, control passes to block 1825 where an energy budget may be determined according to this customer power limit. In an embodiment, the energy budget may be determined according to Equation 2, above.

Still with reference to FIG. 18, if instead the customer power limit is greater than the configured power limit, control passes to diamond 1830 to determine whether the processor temperature is less than a given threshold, e.g., the thermal threshold discussed above. If it is not, control passes to block 1840 where the energy budget can be determined according to the configured power limit. That is, the energy budget determination of Equation 2 may be performed using the configured power limit, as the processor enforces its configured power limit value in this case.

Otherwise, if it is determined that the processor temperature is less than the thermal threshold, control passes from diamond 1830 to block 1850. At block 1850, an updated power limit may be determined based on the temperature. This determination may be as discussed above with regard to, e.g., FIG. 16, including the operations described above to obtain a power limit scaling factor and determine an updated power limit using that scaling factor. Thus, in this case, while the customer requested power limit may not be allowed, a higher than configured power limit may be dynamically determined (thus falling somewhere between the configured power limit and the customer requested power limit, but not as high as the customer requested power limit) and enabled for use during execution. Thereafter an energy budget can be determined according to this updated power limit, e.g., according to Equation 2 (block 1860). Understand that while shown at this high level in the embodiment of FIG. 18, many variations and alternatives are possible. For example, the affirmative determination at diamond 1830 may be targeted primarily at thermal usage models and corresponding updates to the power limit at block 1850 may be targeted primarily for power delivery usage models.

In addition, power limit update logic 1940 may further provide this updated power limit to energy budget logic 1950. Energy budget logic 1950 is further adapted to receive incoming operating parameters. Although the scope of the present invention is not limited in this regard, such operating parameters may include operating voltage and operating frequency information, energy information and so forth. Based on such inputs, energy budget logic 1950 may calculate an energy budget for the processor, e.g., for a next evaluation interval and provide this updated energy budget to comparison logic 1970.

Comparison logic 1970 is further coupled to receive an output from power consumption determination logic 1960. In an embodiment, logic 1960 may determine a current actual power consumption of the processor, e.g., based on at least portions of the same operating parameter information provided to energy budget logic 1950. Based on this comparison performed in comparison logic 1970, it can be determined whether the processor is operating within its updated energy budget. The comparison result is provided to control logic 1980. Control logic 1980 may cause updates to one or more operating parameters based on the comparison. That is, if additional energy budget is available, one or more operating parameters such as frequency and/or voltage may be increased. In turn, if the comparison indicates that the processor is operating at greater than the updated energy budget, control logic 1980 may operate to reduce such operating parameters. Understand that while shown at this high level in the illustration of FIG. 19, many variations and alternatives are possible.

The following examples pertain to further embodiments.

In one example, a processor comprises: at least one core to execute instructions; one or more thermal sensors associated with the at least one core; and a power controller coupled to the at least one core. The power controller may include a control logic to receive temperature information regarding the processor and dynamically determine a maximum allowable average power limit based at least in part on the temperature information, where the control logic is to maintain a static maximum base operating frequency of the processor regardless of a value of the temperature information.

In an example, the maximum allowable average power limit comprises a TDP value.

In an example, when a temperature of the processor is less than a first threshold, the control logic is to dynamically determine the maximum allowable average power limit to be above the TDP value.

In an example, when the temperature of the processor exceeds the first threshold, the control logic is to maintain the maximum allowable average power limit at the TDP value.

In an example, the TDP value comprises a published TDP value for the processor.

In an example, the control logic is to overwrite a specified maximum allowable average power limit stored in a configuration storage with the dynamically determined maximum allowable average power limit.

In an example, the power controller further comprises an energy budget logic to determine an energy budget of the processor based at least in part on the dynamically determined maximum allowable average power limit, a previous energy budget and a previous energy consumption value.

In an example, the control logic is to determine an operating frequency of the processor to be higher than the static maximum base operating frequency, based at least in part on the dynamically determined maximum allowable average power limit being above the specified maximum allowable average power limit.

In an example, the control logic is to access an entry in a first table based on the temperature information and to obtain a power limit scaling value from the entry.

In an example, the control logic is to dynamically determine the maximum allowable average power limit based on a specified maximum allowable average power limit and the power limit scaling value.

In an example, the control logic is to access an entry in a first table based on the temperature information and to obtain an updated maximum allowable average power limit from the entry.

Note that the above processor can be implemented using various means.

In an example, the processor comprises an SoC incorporated in a user equipment touch-enabled device.

In another example, a system comprises a display and a memory, and includes the processor of one or more of the above examples.

In another example, a method comprises: receiving thermal information of a processor; mapping the thermal information to a range of a plurality of ranges; based on the range, determining a power limit scaling factor; and adjusting a TDP value of the processor based on the power limit scaling factor, the TDP value stored in a first storage of the processor.

In an example, the method further comprises determining an energy budget for the processor using the adjusted TDP value.

In an example, the method further comprises: receiving a customer requested power limit of the processor; if the customer requested power limit is less than the TDP value stored in the first storage, enforcing the customer requested power limit; and if the customer requested power limit is greater than the TDP value stored in the first storage and a temperature of the processor is less than a first threshold, adjusting the TDP value to be above the TDP value stored in the first storage.

In an example, the adjusted TDP value comprises a relaxed TDP value higher than the TDP value, the TDP value a rated TDP value for the processor.

In another example, a computer readable medium including instructions is to perform the method of any of the above examples.

In another example, an apparatus comprises means for performing the method of any one of the above examples.

In a still further example, a system comprises a processor having a plurality of cores and a control logic, when a temperature of the processor is less than a threshold temperature, to dynamically update a TDP value to a relaxed TDP value, the relaxed TDP value higher than the TDP value, where the processor is to execute a workload at a first power consumption level based on the relaxed TDP value when the temperature is less than the threshold temperature and to execute the workload at a second power consumption level based on the TDP value when the temperature is greater than the threshold temperature, the first power consumption level greater than the second power consumption level. The system may further include a DRAM coupled to the processor.

In an example, the processor is to execute the workload at a static base operating frequency regardless of the temperature of the processor.

In an example, the processor further comprises a table including a plurality of entries to store a plurality of TDP values, the control logic to obtain the relaxed TDP value from one of the entries of the table based at least in part on the temperature of the processor.

In an example, the method further comprises determining at least one operating parameter for the processor based on the energy budget.

In an example, the control logic is to determine an energy budget for the processor based at least in part on the relaxed TDP value and to update at least one operating parameter of the processor based on the energy budget.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

We claim:

1. A processor, comprising:
one or more temperature sensors;
circuitry to determine an energy budget of the processor for an nth evaluation interval, wherein to determine the energy budget for the nth evaluation interval, the circuitry is to:
update a power limit of the processor according to temperature information from the one or more temperature sensors,
determine an energy consumed by the processor in a previous, $n-1^{st}$ evaluation interval;
determine the energy budget for the nth evaluation interval based on the energy consumed in the previous, n−1st evaluation interval and the updated power limit;
determine an operating voltage of a core of the processor based on the determined energy budget of the processor for the nth evaluation interval; and
provide control information based on the operating voltage; and
an integrated voltage regulator to receive the control information from the circuitry and, in response to the control information, to update the operating voltage of the core of the processor based on the determined energy budget of the processor for the nth evaluation interval, and to apply the updated operating voltage to the core of the processor.

2. The processor of claim 1, wherein the power limit is a maximum allowable average power limit.

3. The processor of claim 1, wherein the power limit is a thermal design power (TDP) value.

4. The processor of claim 2, further comprising:
a mapping circuit to receive the temperature information and to output a range value; and
a table having entries, wherein an entry of the table is accessible via the range value to obtain a power limit scaling value, and the maximum allowable average power limit is determined based on the power limit scaling value.

5. The processor of claim 1, wherein the energy consumed by the processor in the previous, n−1st evaluation interval is determined based on counters that trace micro-architectural activity.

6. The processor of claim 1, wherein the circuitry is to determine the energy budget for the nth evaluation interval based on a rate of decay of the energy budget.

7. The processor of claim 6, wherein the rate of decay is a function of a thermal resistance of a heatsink of a platform of the processor.

8. The processor of claim 6, wherein:
the energy budget for the nth evaluation interval is $E_n = E_{n-1}*alpha+(1-alpha)*(Power\_Limit*deltaT-Energy)$;
$E_{n-1}$ is an energy budget of the processor in the previous, n−1st evaluation interval;
alpha is the rate of decay of the energy budget;
Power_Limit is the updated power limit;
deltaT is an evaluation interval at which the energy budget is computed; and
Energy is the energy consumed by the processor in the previous, n−1st evaluation interval.

9. The processor of claim 1, wherein the circuitry ensures that the energy budget for the nth evaluation interval provides sufficient power for processing engines of the processor to continuously execute a baseline workload at a base operating frequency.

10. The processor of claim 1, wherein the circuitry ensures that the energy budget for the nth evaluation interval provides sufficient power for processing engines of the processor to continuously execute a thermal design power workload at a base operating frequency.

11. The processor of claim 1, wherein:
the update comprises an increase in the operating voltage if the processor is operating within the determined energy budget of the processor for the nth evaluation interval; and
the update comprises a reduction in the operating voltage if the processor is not operating within the determined energy budget of the processor for the nth evaluation interval.

12. A system, comprising:
a memory which stores one or more instructions; and
a processor circuitry coupled to the memory, wherein the processor circuitry is to execute the one or more instructions to:
receive a requested power limit;
determine an energy budget of the processor circuitry according to the requested power limit in response to a determination that the requested power limit is less than a configured power limit of the processor circuitry;
determine the energy budget of the processor circuitry according to the configured power limit of the processor circuitry in response to a determination that the requested power limit is greater than the configured power limit of the processor circuitry and a determination that a temperature of the processor circuitry is greater than a threshold;
determine an operating voltage of a core of the processor circuitry based on the determined energy budget of the processor circuitry; and
provide control information based on the operating voltage;
wherein a voltage regulator of the processor circuitry is to receive the control information and, in response to the control information, update the operating voltage of the core of the processor circuitry based on the determined energy budget of the processor circuitry.

13. The system of claim 12, wherein the processor circuitry is to execute the one or more instructions to update the requested power limit in response to the determination that the requested power limit is greater than the configured power limit of the processor circuitry and the determination that the temperature of the processor circuitry is greater than the threshold.

14. The system of claim 13, wherein the requested power limit is updated to be less than the configured power limit of the processor circuitry.

15. The system of claim 13, wherein the requested power limit is updated to be between the configured power limit of the processor circuitry and the requested power limit.

16. The system of claim 13, wherein the processor circuitry is to execute the one or more instructions to update the requested power limit based on the temperature.

17. The system of claim 13, wherein to update the requested power limit, the processor circuitry is to execute the one or more instructions to determine a maximum allowable average power limit based on the temperature.

18. The system of claim 12, wherein:

the processor circuitry comprises a mapping circuit to receive the temperature and to output a range value;

the processor circuitry comprises a table having entries;

an entry of the table is accessible via the temperature to obtain a power limit scaling value; and the processor circuitry is to execute the one or more instructions to determine a maximum allowable average power limit based on the power limit scaling value.

19. A non-transitory machine-readable storage medium having machine-readable instructions stored thereon, that when executed, cause one or more machines to:

update a power limit of a processor according to temperature information from one or more temperature sensors;

determine an energy budget $E_n$ of the processor for a current evaluation interval as $En=E_{n-1}*alpha+(1-alpha)*(Power\_Limit*deltaT-Energy)$; wherein:

$E_{n-1}$ is an energy budget of the processor in a previous evaluation interval, prior to the current evaluation interval;

alpha is a rate of decay of the energy budget;

Power_Limit is the updated power limit;

deltaT is an evaluation interval at which the energy budget is computed; and

Energy is an energy consumed by the processor in the previous evaluation interval, wherein the energy consumed by the processor in a previous evaluation interval is based on counters that trace micro-architectural activity;

update an operating voltage of a core of the processor based on the determined energy budget of the processor; and apply the updated operating voltage to the core of the processor.

20. The non-transitory machine-readable storage medium of claim 19, wherein the power limit is a maximum allowable average power limit based on the temperature information.

21. The non-transitory machine-readable storage medium of claim 19, wherein the rate of decay is a function of a thermal resistance of a heatsink of a platform of the processor.

* * * * *

UNITED STATES PATENT AND TRADEMARK OFFICE
CERTIFICATE OF CORRECTION

PATENT NO. : 11,841,752 B2
APPLICATION NO. : 17/338547
DATED : December 12, 2023
INVENTOR(S) : Tessil Thomas et al.

It is certified that error appears in the above-identified patent and that said Letters Patent is hereby corrected as shown below:

In the Claims

Column 27:
Lines 15-16 "temperature sensors," should read -- temperature sensors; --

Signed and Sealed this
Thirteenth Day of August, 2024

Katherine Kelly Vidal
*Director of the United States Patent and Trademark Office*